United States Patent [19]
Gofuku et al.

[11] Patent Number: 5,973,761
[45] Date of Patent: Oct. 26, 1999

[54] FERROELECTIC LIQUID CRYSTAL DEVICE HAVING A LOW-RESISTIVITY LAYER BELOW AN ALIGNMENT CONTROL LAYER

[75] Inventors: Ihachiro Gofuku, Atsugi; Shinjiro Okada, Isehara; Yasuto Kodera, Fujisawa; Masahiro Terada, Hadano; Fumikazu Kobayashi, Atsugi; Nobuhiro Ito, Sagamihara, all of Japan

[73] Assignee: Canon Kabushiki Kaisha, Tokyo, Japan

[21] Appl. No.: 09/015,326

[22] Filed: Jan. 29, 1998

[30] Foreign Application Priority Data

Jan. 31, 1997 [JP] Japan ..................... 9-018771

[51] Int. Cl.⁶ ............................ G02F 1/1337; G02F 1/141
[52] U.S. Cl. ........................ 349/128; 349/123; 349/126; 349/133
[58] Field of Search ..................... 349/123, 124, 349/133, 134, 135, 128, 126, 131

[56] References Cited

U.S. PATENT DOCUMENTS

| | | | |
|---|---|---|---|
| 4,681,404 | 7/1987 | Okada et al. ................ | 349/84 |
| 5,099,344 | 3/1992 | Tsuboyama et al. ........ | 345/138 |
| 5,165,076 | 11/1992 | Tsuboyama et al. ........ | 345/184 |
| 5,177,475 | 1/1993 | Stephany et al. ........... | 345/96 |
| 5,381,256 | 1/1995 | Hanyu et al. ............... | 349/37 |
| 5,514,426 | 5/1996 | Eguchi ........................ | 428/1 |
| 5,557,435 | 9/1996 | Hanyu et al. ............... | 349/123 |
| 5,573,703 | 11/1996 | Terada et al. ............... | 252/299.01 |
| 5,597,626 | 1/1997 | Eguchi ........................ | 428/1 |
| 5,629,788 | 5/1997 | Mori et al. .................. | 349/172 |
| 5,666,217 | 9/1997 | Kaneko et al. .............. | 349/122 |
| 5,750,214 | 5/1998 | Ito et al. ..................... | 428/1 |

FOREIGN PATENT DOCUMENTS

| | | |
|---|---|---|
| 54-049023 | 4/1979 | Japan . |
| 61-186930 | 8/1986 | Japan . |
| 63-121020 | 5/1988 | Japan . |
| 93-022396 | 11/1993 | WIPO . |

Primary Examiner—William L. Sikes
Assistant Examiner—Heidi L. Eisenhut
Attorney, Agent, or Firm—Fitzpatrick, Cella, Harper & Scinto

[57] ABSTRACT

A liquid crystal device is formed by a pair of substrates, and a liquid crystal disposed between the substrates. At least one substrate has thereon a laminar structure including an electrode, an electrical property control layer and an alignment control layer contacting the liquid crystal disposed in this order on the substrate. The alignment control layer has a thickness of at most 100 Å, has been subjected to a uniaxial aligning treatment and has a volume resistivity larger than that of the electrical property control layer. The liquid crystal device thus constituted may exhibit a reduced influence of reverse electric field and a suppressed switching asymmetry over a wide temperature range.

21 Claims, 6 Drawing Sheets

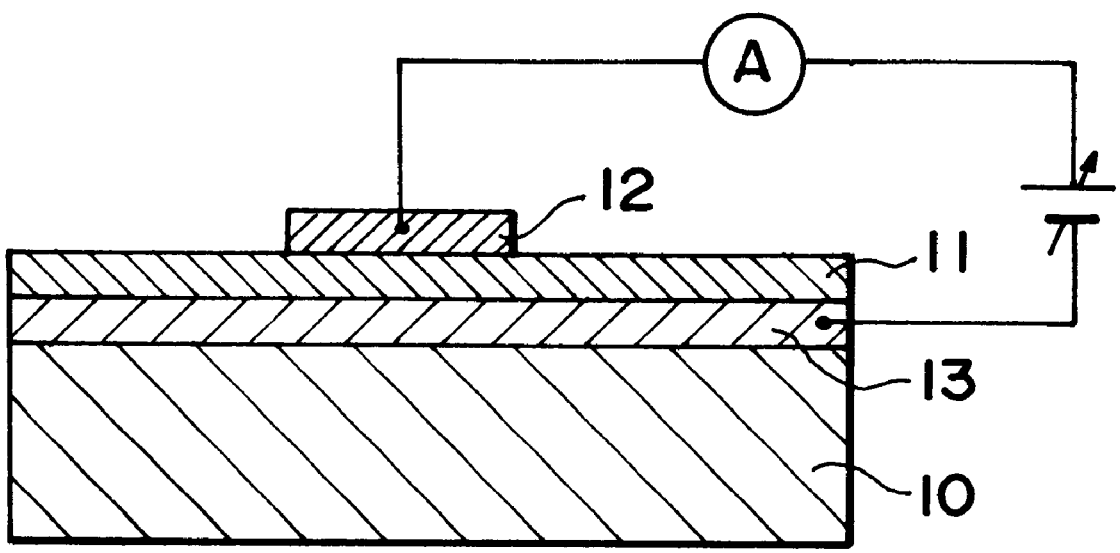
F I G. 3

FERROELECTIC LIQUID CRYSTAL DEVICE HAVING A LOW-RESISTIVITY LAYER BELOW AN ALIGNMENT CONTROL LAYER

FIELD OF THE INVENTION AND RELATED ART

The present invention relates to a liquid crystal device used in flat panel displays, projection displays, printers, etc., and also a liquid crystal apparatus including such a liquid crystal device.

A representative type of liquid crystal device extensively used in recent years may be a liquid crystal panel equipped with a switching device, such as a TFT (thin film transistor), at each pixel. Such a TFT liquid crystal panel still involves unsatisfactory points, such that it provides an insufficient viewing angle characteristic, it leaves a difficulty in production of a large-area panel, and it requires a large drive electric power.

Application and development of a liquid crystal device using a liquid crystal showing bistability as proposed by Clark and Lagerwall (in, e.g., U.S. Pat. No. 4,367,924) for solving the above-mentioned difficulties, are under way.

As such a liquid crystal showing bistability between substrates, a ferroelectric crystal comprising a chiral smectic C phase or H phase has been generally used. The ferroelectric liquid crystal causes an inversion switching between two states owing to a function of its spontaneous polarization and realizes bistability having a memory characteristic. Accordingly, it is possible to provide a panel having a simple matrix structure and allowing a pulse drive of a lower duty factor and a lower power consumption than a TFT-type panel. Further, as the matrix electrode structure is simplified, a large-area panel can be realized easily. Further, as a remarkable characteristic of a ferroelectric liquid crystal, it causes a switching on a plane to provide a broader viewing angle, thus alleviating a drawback of a TFT-type panel.

Such a chiral smectic liquid crystal is accompanied with problems, such as the occurrence of zigzag-shaped alignment defects leading to a lowering in contrast (as described in, e.g., "Structure and Physical Properties of Ferroelectric Liquid Crystal" (in Japanese) authored by Atsuo Fukuda and Hideo Takezoe; Corona Sha K.K., (1990)). The defects are considered to be attributable to a layer structure of a chiral smectic liquid crystal including two types of chevron structures between a pair of substrates. Recently, in order to provide an improvement to the chevron structure accompanied with such difficulties several proposals have been made to form a liquid crystal layer structure of a so-called bookshelf structure wherein smectic layers are aligned substantially perpendicularly to the substrates or a structure close thereto, thereby providing a liquid crystal device showing a high contrast (as disclosed in, e.g., "Next Generation Liquid Crystal Display and Liquid Crystal Materials" (in Japanese), edited by Atsuo Fukuda; K.K. C.M.C., (1992)).

As a liquid crystal material providing a bookshelf structure or a structure close thereto, a class of mesomorphic compounds having a perfluoroalkyl ether terminal chain and a liquid crystal composition containing such a mesomorphic compound have been disclosed (U.S. Pat. No. 5,262,092, International Patent Application WO93/22396; Marc D. Raddiffe et al., 1993 Fourth Ferroelectric Liquid Crystal Interference Meeting, p-46). Such a liquid crystal material is possible to provide a bookshelf structure or a similar structure having a small layer inclination angle without using an external field, such as an electric field, thus being suitable for providing a liquid crystal device or apparatus of a high speed, a high resolution and a large area.

On the other hand, in such a device using a liquid crystal having a chiral smectic phase and showing ferroelectricity, there has been encountered a problem of so-called reverse electric field that the spontaneous polarization of the liquid crystal induces localized charges in the device, which are liable to result in a switching failure. In order to alleviate the problem, it has been proposed to provide an alignment control layer having a lower impedance (e.g., Japanese Laid-Open Patent Application (JP-A) 63-121020, and JP-A 54-49023). It has been also proposed to use an alignment control layer having a laminate structure for providing a lower impedance (e.g., JP-A 61-186930).

In such a liquid crystal device including an alignment control layer having a lowered impedance, it is possible that the alignment control layer exerts only an insufficient alignment control force, particularly an insufficient uniaxial alignment control force, to the liquid crystal molecules, thus failing to provide a good liquid crystal alignment state (control of the state of alignment of liquid crystal molecules). This can be particularly problematic in a liquid crystal device of the type described above comprising a liquid crystal showing a chiral smectic phase between a pair of substrates. For example, even if a multi-layer structure including a layer subjected to a uniaxial aligning treatment (typically, a polyimide film subjected to rubbing) and a lower specific resistance layer disposed therebelow (as disclosed in the above-mentioned JP-A 61-186930) is used, it is difficult to provide a sufficiently low impedance while removing the influence of the resistance of the polyimide film, so that it is difficult to well control the alignment state of a liquid crystal having a high spontaneous polarization and realize a high-speed switching.

SUMMARY OF THE INVENTION

In view of the above-mentioned problems, the present invention aims at providing an improved liquid crystal alignment characteristic and an alignment control layer having a lowered impedance stably and in combination.

According to the present invention, there is provided a liquid crystal device, comprising a pair of substrates and a liquid crystal disposed between the substrates, wherein at least one substrate has thereon a laminar structure including an electrode, an electrical property control layer and an alignment control layer contacting the liquid crystal disposed in this order on the substrate, and said alignment control layer has a thickness of at most 100 Å, has been subjected to a uniaxial aligning treatment and has a volume resistivity larger than the electrical property control layer.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 illustrates a system for measuring a volume resistivity of a layer or a film contained in a liquid crystal device.

DESCRIPTION OF THE PREFERRED EMBODIMENTS

Figure 1:
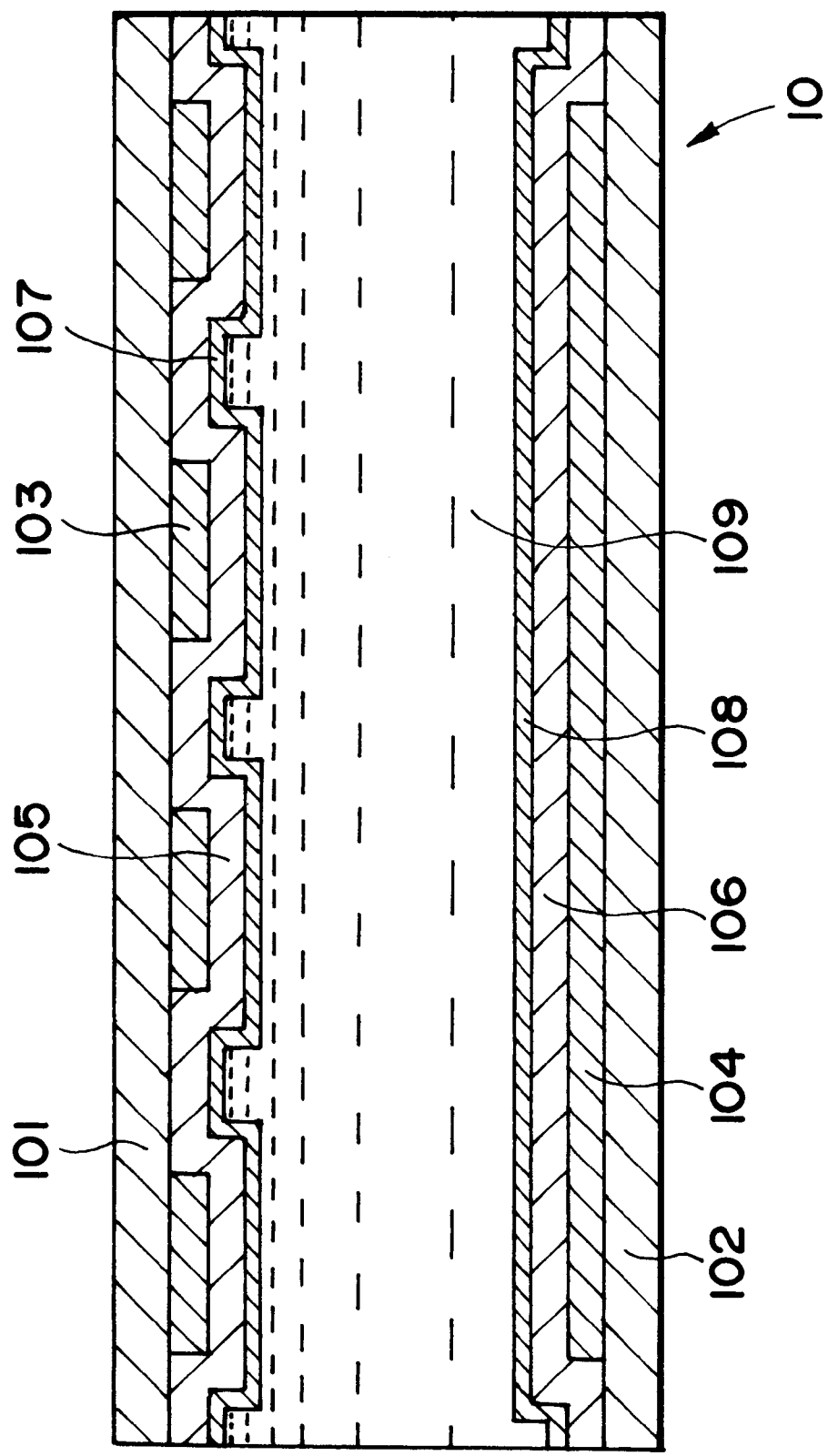
FIGS. 1 and 2 are respectively a schematic sectional view of an embodiment of the liquid crystal device according to the invention.

The liquid crystal device according to the present invention is characterized by including a pair of substrates, at least one of which has, as a layer disposed above an electrode, an alignment control layer contacting a liquid crystal and formed in a thin layer (of at most 100 Å in thickness) having a uniaxial alignment control power, and also an electrical property control layer which is disposed below the alignment control layer and has a volume resistivity lower than that of the alignment control layer for controlling the electrical property of the substrate acting on the liquid crystal.

In such a device structure, the alignment control layer may be disposed in a very thin layer on the electrical property control layer on at least one substrate, the electrical property control layer having a lower volume resistivity below the alignment control layer exerts an electrical influence to the liquid crystal, and the alignment control layer disposed thereabove and contacting the liquid crystal exerts a sufficient molecular-aligning coupling force onto the liquid crystal molecules. As a result, it becomes possible to provide a layer functioning as a low impedance layer electrically acting on the liquid crystal while ensuring a liquid crystal alignment performance (an order of liquid crystal molecular alignment). Particularly, in the case of using a liquid crystal showing a chiral smectic phase and ferroelectricity, it becomes possible to alleviate the adverse effect of a reverse electric field due to spontaneous polarization of the liquid crystal molecules, thus allowing the use of a liquid crystal having a larger spontaneous polarization leading to a higher-speed switching.

In the liquid crystal device according to the present invention, the alignment control layer may preferably be set to at most ca. 70 Å, particularly preferably at most 50 Å, so as to ensure the function of the alignment control layer contacting the liquid crystal for controlling the liquid crystal alignment characteristic and the function of the lower electrical property control layer for stably preventing the adverse effect of a reverse electric field.

The electrical property control layer governing the electrical property of the multi-layer structure acting on the liquid crystal may preferably have a volume resistivity (at room temperature) set to be in the range of $1.0 \times 10^4 - 1.0 \times 10^{10}$ ohm.cm. As a result, particularly in the case of a liquid crystal device using a chiral smectic liquid crystal, it becomes possible to realize a higher speed switching by using a liquid crystal having a higher spontaneous polarization. It is particularly preferred that the volume resistivity is set in the range of $1.0 \times 10^4 - 1.0 \times 10^8$ ohm.cm while it is higher than that of the electrode disposed therebelow.

The thickness of the electrical property control layer may be determined depending on the material, volume resistivity value, etc., and may preferably be in the range of 500 Å–1 μm.

In a device using a liquid crystal having a chiral smectic phase and showing ferroelectricity, depending on the liquid crystal material used, e.g., in the case of using a material causing a phase transition directly from isotropic phase to a smectic phase (smectic A phase) without intermediating cholesteric phase at least in the course of temperature decrease, it is preferred that a pair of substrates are provided with alignment control layers having mutually different surface properties so as to exhibit mutually different alignment control forces (forces for controlling arrangement of liquid crystal molecules). More specifically, one substrate may be provided with an alignment control layer subjected to a uniaxial aligning treatment (i.e., having a uniaxial alignment control force), and the other substrate may be provided with an alignment control layer having a surface property different from that of the alignment control layer on the one substrate and/or not subjected to a uniaxial aligning treatment. This structure is particularly preferred in a device wherein smectic liquid crystal layers exhibit a bookshelf structure or a structure close thereto, so as to obtain a uniform liquid crystal alignment state at a high degree of order depending on the phase transition characteristic of the liquid crystal material.

In the above-mentioned device structure using a liquid crystal not assuming cholesteric phase, one substrate may be successively provided with an electrode, an electrical property control layer and a first alignment control layer which has a thickness of at most 100 Å, has been subjected to a uniaxial aligning treatment, contacts the liquid crystal and has a larger volume resistivity than the electrical property control layer, and the other substrate may be provided with a second alignment control layer which has a surface energy different from that of the first alignment control layer or has not been subjected to a uniaxial aligning treatment. Further, the electrical property control layer on the one substrate and the second alignment control layer on the other substrate may respectively have a volume resistivity (at room temperature) set within a range of $1.0 \times 10^4 - 1.0 \times 10^{10}$ ohm.cm, particularly $1.0 \times 10^4 - 1.0 \times 10^8$ ohm.cm. As a result, in such a device structure including a pair of substrates provided with alignment control layers having mutually different alignment control forces acting on liquid crystal molecules, it becomes possible to well improve the problem of reverse electric field due to the spontaneous polarization of a liquid crystal material assuming a chiral smectic phase, thereby allowing a high-speed switching by using a higher spontaneous polarization of preferably at least 10 $nC/cm^2$, particularly at least 20 $nC/cm^2$, in terms of an absolute value. In this case, the thickness of the electrical property control layer on the one substrate and the second alignment control layer on the other substrate may be set depending on the materials, volume resistivities, etc., but may preferably be in the range of 500 Å–1 μm.

In the liquid crystal device of the above-mentioned structure, the first alignment control layer subjected to a uniaxial aligning treatment may preferably have a surface energy including a dispersion term ($\gamma_d$) which is at least 40 dyne/cm and larger by at least 5 dyne/cm than that of the opposing second alignment control layer. By satisfying the surface energy relationship, it becomes possible to realize a further better alignment state of a liquid crystal not assuming cholesteric phase. It is further preferred that the electrical property control layer is set to have a surface energy (dispersion term) of at least 25 dyne/cm in view of the coatability with the first alignment control layer disposed thereon.

In case where a pair of substrates are provided with different properties of boundaries with a liquid crystal, even if the liquid crystal (chiral smectic liquid crystal) is disposed in a good alignment state, there arise asymmetrical behaviors of switching between two stable states of liquid crystal molecules. More specifically, there is liable to occur a problem that the characteristic of liquid crystal molecules of a liquid crystal showing ferroelectricity being switched from a first stable state to a second stable state is not identical to that of the liquid crystal molecules being switched from the second stable state to the first stable state, thus being liable to fail in stably developing bistability of a device using a liquid crystal showing ferroelectricity.

Accordingly, in the liquid crystal device of the above-described structure, it is preferred that the material compositions of the electrical property control layer on the one substrate and the second alignment control layer on the other substrate are adjusted so that these layers show substantially identical surface potentials for an operation temperature range including at least room temperature, thus exerting identical electrical influences to the liquid crystal. Further, as the electrical properties (volume resistivity, surface potential, etc.) of the electrical property control layer on the one substrate and the second alignment control layer on the other substrate may be temperature-dependent, so that a balance of characteristic, such as surface potential, can be disordered over a wide temperature range. In view of this factor, in the liquid crystal device of the above-described structure, it is particularly preferred that the electrical property control layer formed on the one substrate also provided with the first alignment control layer subjected to a uniaxial aligning treatment, and the second alignment control layer formed on the other substrate (having a surface energy different from that of the first alignment control layer and/or not subjected to a uniaxial aligning treatment), comprise similar species of materials. As a result, it becomes possible to provide the device with an improved switching symmetry and maintain a constant state of electrical properties of both substrates acting on the liquid crystal even when an environmental condition, such as a temperature, varies, thereby ensuring a symmetry of switching characteristic.

The structure of the liquid crystal device according to the present invention will be described with respect to an embodiment thereof while referring to FIG. 1.

A liquid crystal device 10 shown in FIG. 1 includes a pair of oppositely disposed substrates 101 and 102 respectively of glass, plastic, etc., having thereon electrodes 103 and 104, respectively, formed in prescribed patterns. The electrodes may comprise a transparent conductor film of, e.g., $In_2O$, $SnO_2$ or ITO (indium tin oxide). The electrodes 103 and 104 may respectively be formed in stripes and arranged to intersect each other at substantially right angles to form an electrode matrix.

The electrodes 103 on one substrate 101 are coated successively with an electrical property control layer 105 and an alignment control layer 107. The electrodes 104 on the other substrate 102 are coated successively with a layer 106 and a layer 108, which function to exert influences on the electrical property and the alignment state of the liquid crystal and of which at least the layer 108 functions as an alignment control layer contributing to liquid crystal alignment.

These substrates 101 and 102 having such laminar structures are disposed opposite to each other with a prescribed spacing therebetween, so as to sandwich therebetween a liquid crystal 109, such as a liquid crystal assuming a chiral smectic phase.

The electrical property control layer (105) is a layer having a volume resistivity which is smaller than that of the alignment control layer (107) disposed thereon and is preferably in the range of $1.0 \times 10^4$–$1.0 \times 10^{10}$ ohm.cm.

Such an electrical property control layer may for example comprise a polycrystalline or amorphous metal oxide film, a polycrystalline or amorphous semiconductor film or a film comprising a binder and electroconductivity-imparted particles dispersed in the binder. The polycrystalline or amorphous metal oxide film, the polycrystalline or amorphous semiconductor film, and the particles may have an adjusted electroconductivity by adding conductivity-controlling impurities as desired.

Examples of the polycrystalline or amorphous metal oxide may include: oxides of Group 12 elements, such as ZnO, CdO and $ZnCdO_x$; and oxides of Group 4 and 14 elements, such as $GeO_2$, $SnO_2$, $GeSnO_x$, $TiO_2$, $ZnO_2$, and $TiZrO_x$.

Examples of the polycrystalline or amorphous semiconductor may include: Group 14 semiconductors, such as Si and SiC.

Examples of the dispersed particles may include: particles of the above-mentioned oxides of Group 12 elements, oxides of Group 4 elements, oxides of Group 14 elements, and Group 14 semiconductors.

Examples of the optionally added conductivity-controlling impurities may include: Group 13 elements, such as B, Al, Ga and In as n-type impurities (donor/electron conductivity-enhancing impurities), and Group 1 and 11 elements, such as Cu, Ag, Au and Li, as p-type impurities (acceptor/hole conductivity-enhancing impurities), respectively for doping the oxides of Group 12 elements; and Group 15 elements, such as P, As, Sb and Bi, as n-type impurities, and Group 13 elements, such as B, Al, Ga and In, as p-type impurities, respectively for doping the oxides or semiconductors of Group 14 elements.

As the conductivity-controlling impurity, a donor may be used in case where the substrate having an electrical property control layer comprising a material doped with the impurity has a positive surface potential, and an acceptor may be used in case of a negative surface potential. The additive impurity concentration may be set depending on the species (particles, combination with impurities, etc.) and crystalline states (level of crystal defect density) of materials and may preferably be set to provide a free electron or free hole concentration on the order of $1.0 \times 10^{11}$–$1.0 \times 10^{14}$ atm/$cm^3$ after the impurity addition. In the case of using a polycrystalline or amorphous material as a matrix material to be doped with the impurity, it may be suitable to set an actual addition level of $1.0 \times 10^{17}$–$1.0 \times 10^{20}$ atm/$cm^3$ (on the order of 0.01–1% of the matrix material) in consideration of the efficiency of the impurity addition.

Examples of the binder material for dispersing the particles may include: $SiO_x$, $TiO_x$, $ZrO_x$, fused matrix of other oxides, and siloxane polymer.

The alignment control layer 107 is disposed on the electrical property control layer 105 and subjected to a uniaxial aligning treatment. The thickness is at most 100 Å, preferably at most 70 Å, further preferably at most 50 Å.

Such an alignment control layer may for example be provided by forming a film of an organic material by solution coating, etc., and rubbing the film with a fibrous material, such as velvet, cloth or paper. Examples of the organic film material for constituting an alignment control layer to be provided with a uniaxial alignment control force by rubbing may include: polyvinyl alcohol, polyimide, polyamideimide, polyester, polyamide, polyesterimide, polyparaxylylene, polycarbonate, polyvinyl acetal, polyvinyl chloride, polystyrene, polysiloxane, cellulosic resin, melamine resin, urea resin and acrylic resin. It is also possible to form such an alignment control layer (105) by oblique vapor deposition, i.e., vapor deposition in an oblique direction onto a substrate, of an oxide, such as SiO, or a nitride, to form a film provided with a uniaxial alignment control force.

In the present invention, as an alignment control layer subjected to a uniaxial aligning treatment, it is particularly preferred to use a film of a polyimide having a recurring unit represented by the following general formula P:

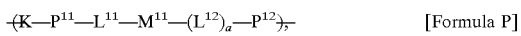 [Formula P]

wherein K is ia tetra valent-group of

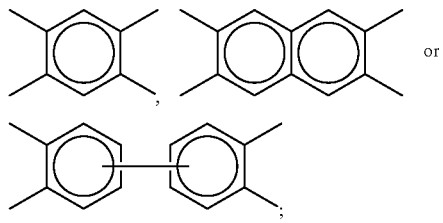 or $L_{11}$ and $L^{12}$ independently denote

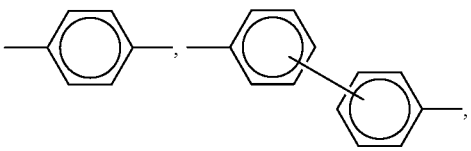

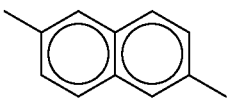

or an alkylene group having 1–20 carbon atoms; $P^{11}$ and $P^{12}$ denote an imide bond; $M^{11}$ denotes a single bond or —O—; and a is 0, 1 or 2.

Specific examples of the polyimide may include those having the following recurring units:

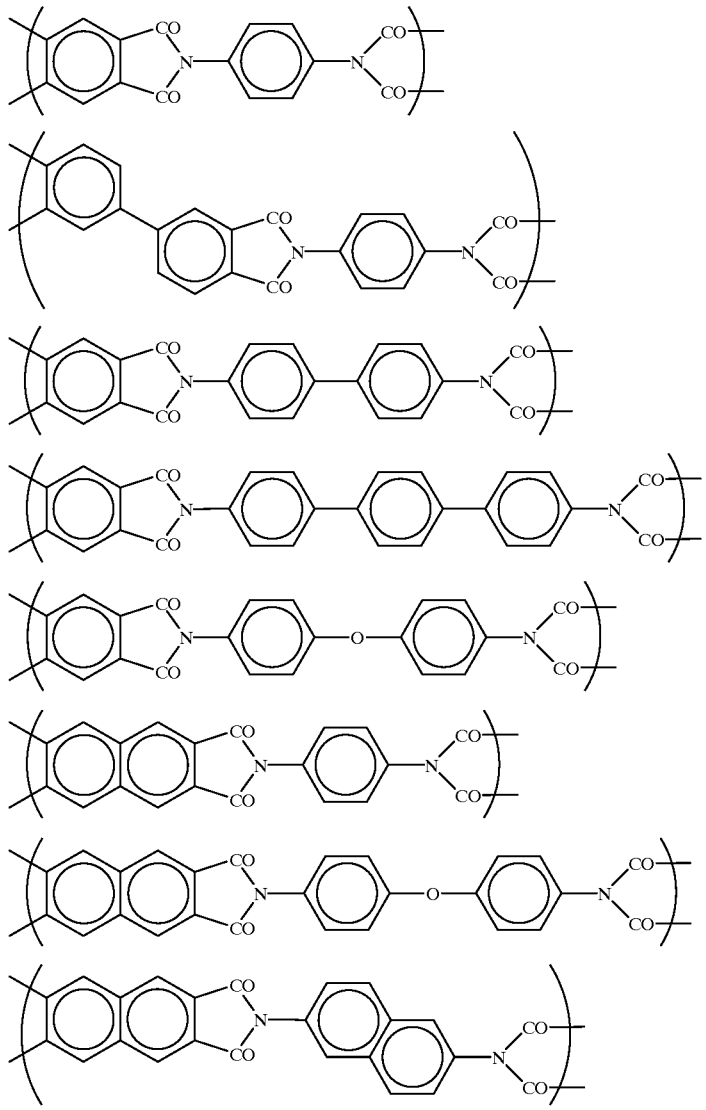

-continued

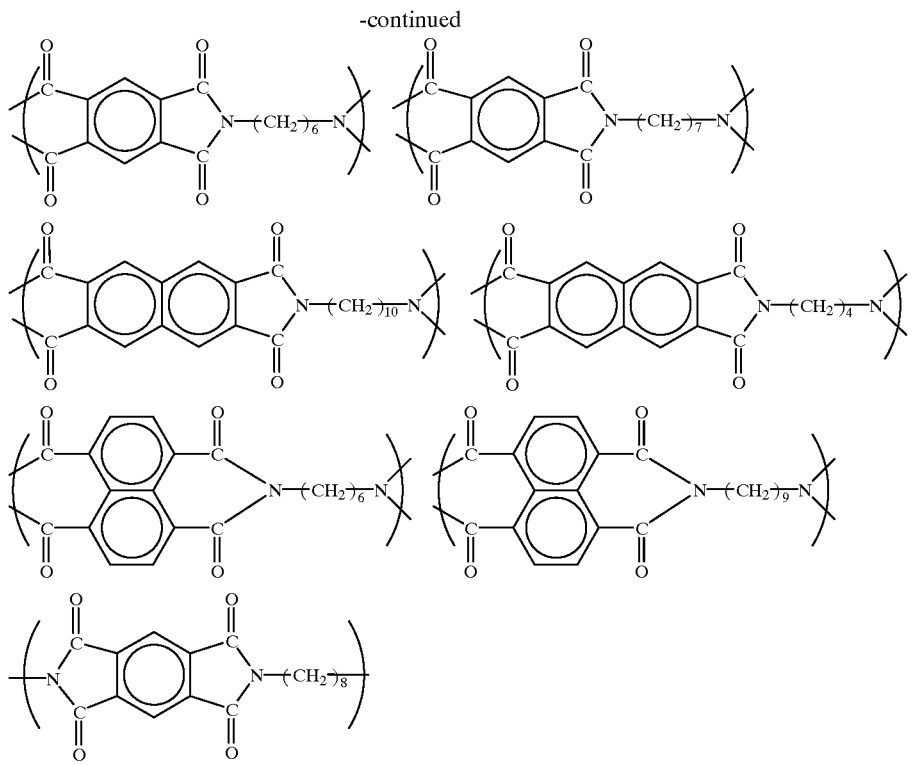

In the device 10 shown in FIG. 1, the layers 106 and 108 may comprise materials selected depending on the material of the liquid crystal 109 used. For example, the layers 106 and 108 may comprise materials and designs (volume resistivity, surface energy, uniaxial aligning treatment, etc.) identical to those of the electrical property control layer 105 and the alignment control layer 107, respectively, on the substrate 101.

In the liquid crystal device 10, the pair of the substrates 101 and 102 were disposed opposite to each other via a sealing agent (not shown) disposed at the periphery and spacer beads (not shown) disposed in a region defined by the sealing agent to leave a cell gap, which may be set to a value, e.g., in the range of ca. 1–5 μm in the case of using a liquid crystal assuming a chiral smectic phase (liquid crystal showing ferroelectricity). It is also possible to disperse adhesive beads in addition to the spacer beads in order to enhance the adhesion between the substrates.

Another embodiment of the liquid crystal device according to the present invention is described with reference to FIG. 2, a sectional view.

Figure 2:
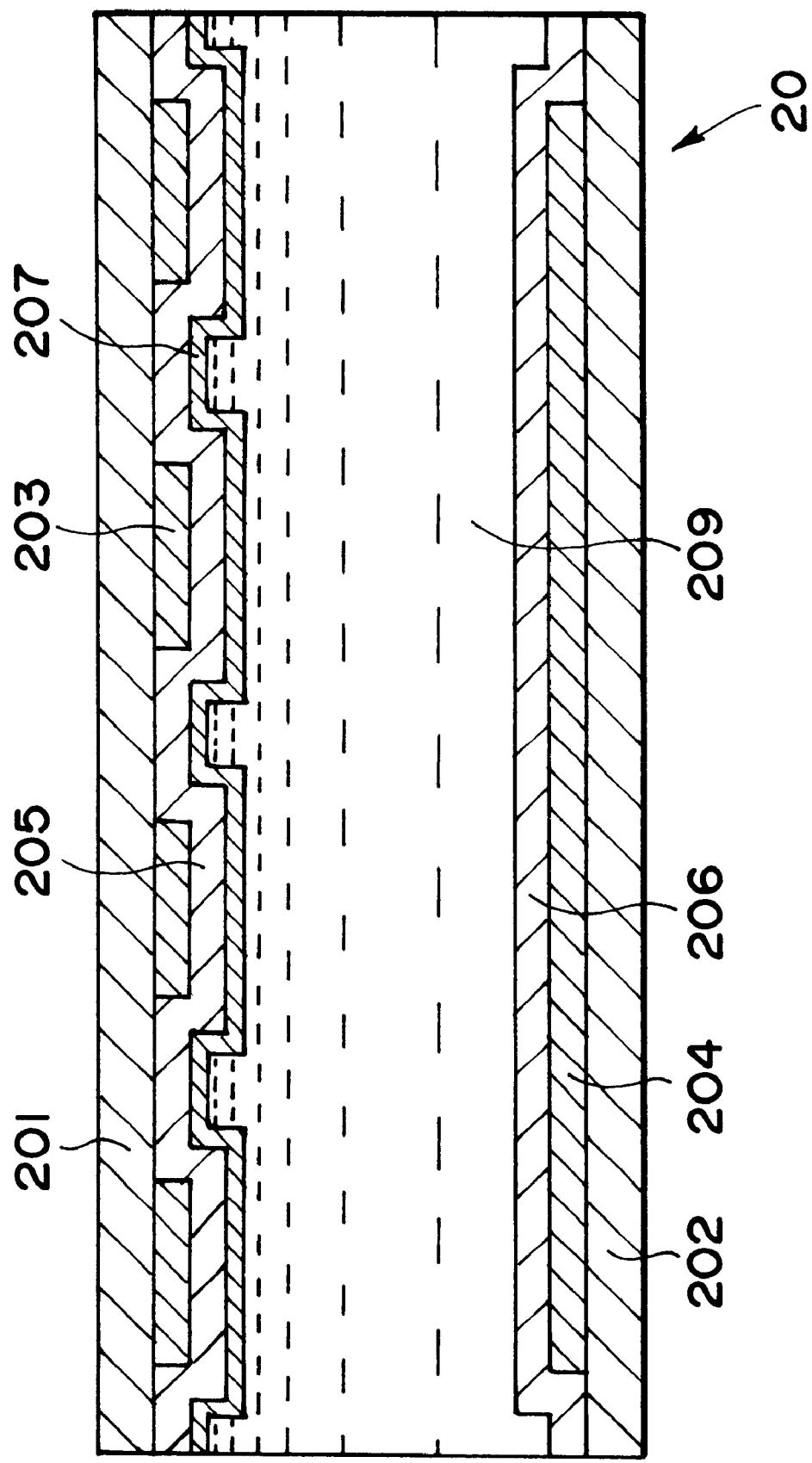

Referring to FIG. 2, a liquid crystal device 20 includes a pair of substrates 201 and 202 disposed opposite to each other and having thereon electrodes 203 and 204, respectively, formed in stripes and disposed to intersect each other substantially at right angles to form a matrix electrode structure. The substrates 201, 202 and electrodes 203, 204 may comprise materials similar to those of the substrates 101, 102 and electrodes 103, 104 of the liquid crystal device 10 shown in FIG. 1. The substrates 201 and 202 are disposed opposite to each other via a sealing agent, spacer beads and adhesive beads, as desired, similarly as in the device 10 of FIG. 1.

The liquid crystal device 20 includes different layer structures on the pair of substrates. More specifically, the substrate 201 has electrodes 203, an electrical property control layer 205 and an alignment control layer (first alignment control layer) 207 successively disposed thereon. The oppositely disposed substrate 202 has electrodes 204 and a single layer of alignment control layer (first alignment control layer) 206 disposed successively thereon. A pair of the substrates 201 and 202 having such laminar structures are disposed opposite to each other with a prescribed gap therebetween so as to sandwich a liquid crystal 209, such as a chiral smectic liquid crystal assuming a chiral smectic phase.

The electrical property control layer 205 and the alignment control layer 207 have properties identical to those of the electrical property control layer 105 (106) and the alignment control layer 107 (108), respectively. More specifically, the electrical property control layer 205 has a volume resistivity which is smaller than that of the alignment control layer 206 and preferably in the range of $1.0 \times 10^4$–$1.0 \times 10^{10}$ ohm.cm. The alignment control layer 207 having a thickness of at most 100 Å is disposed on the electrical property control layer 205 and subjected to a uniaxial aligning treatment so as to contact the liquid crystal 209. These two layers may also be composed of materials identical to those of the electrical property control layer 105 (106) and the alignment control layer 107 (108), respectively, described with reference to FIG. 1.

The second alignment control layer 206 may preferably have a volume resistivity in the range of $1.0 \times 10^4$–$1.0 \times 10^{10}$ ohm.cm similarly as the electrical property control layer 205 (i.e., similarly as the layer 105 (or 106) in the embodiment of FIG. 1), and also have a surface energy (particularly a dispersion term thereof) different from that of the first alignment control layer 207 or be free from a uniaxial aligning treatment. The second alignment control layer 209. The second alignment control layer may be composed of materials selected from those capable of constituting the electrical property control layer 205 (i.e., those enumerated for constituting the electrical property control layer 105 (or 106) in the embodiment of FIG. 1). It is particularly preferred that the electrical property control layer 205 and the alignment control layer 206 are composed of identical materials.

In the liquid crystal device 20, one substrate is subjected to a uniaxial aligning treatment with respect to its surface contacting the liquid crystal, and the other substrate is provided with a surface having a different surface energy (dispersion term) or not subjected to a uniaxial aligning treatment. The structure is particularly preferred for developing a good liquid crystal alignment state (molecular alignment state) in case where the liquid crystal 209 comprises a liquid crystal not assuming cholesteric phase but assuming a chiral smectic phase.

The liquid crystal material used in the present invention (constituting the liquid crystal 109 in the embodiment of FIG. 1 or the liquid crystal 209 in the embodiment of FIG. 2) may preferably be a material having a chiral smectic phase and showing ferroelectricity. It is preferred to use a liquid crystal composition containing a fluorine-containing mesomorphic compound including a fluorocarbon terminal portion and a hydrocarbon portion connected via a central core and having a smectic phase or a latent smectic phase. The term "latent smectic phase" refers to a property of a compound concerned that the compound alone does not exhibit smectic phase but can be a component compatibly contained in smectic phase of a liquid crystal composition together with another mesomorphic compound having a smectic phase or a latent smectic phase.

In the above-mentioned fluorine-containing mesomorphic compound as a principal component in the liquid crystal composition for use in the liquid crystal device of the present invention, the central core may comprise at least two rings independently selected from aromatic rings, alicyclic rings, substituted aromatic rings, and substituted heterocyclic aromatic rings, wherein at least two rings can be connected via a functional group selected from —COO—, —COS—, —HC=N and —COSe—. These rings can be fused or not fused. The hetero atom(s) in the heterocyclic aromatic rings may include at least one atom selected from N, O and S. Methylene groups in the alicyclic rings can be replaced by O provided that both of mutually adjacent methylene groups cannot be replaced by O.

A liquid crystal composition containing such a fluorine-containing mesomorphic compound may particularly suitably be used in a liquid crystal device (20) as shown in FIG. 2 including one substrate having thereon an electrical property control layer (205) and a first alignment control layer (207) subjected to a uniaxial aligning treatment and the other substrate having thereon a second alignment control layer (206).

In a preferred class of the fluorine-containing mesomorphic compound, the fluorocarbon terminal portion may preferably be:

a group represented by the formula —$D^1$—$C_{xa}F_{2xa}$—X, where xa is 1–20; X is —H or —F; —$D^1$— is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N$(C_{pa}H_{2pa+1})$—$SO_2$— or —$(CH_2)_{ra}$—N$(C_{pa}H_{2pa+1})$—CO—; where ra and rb are independently 1–20; and pa is 0–4; or a group represented by —$D^2$—$(C_{xb}F_{2xb}$—O$)_{za}$—$C_{ya}F_{2ya+1}$, wherein xb is 1–10 independently for each ($C_{xb}F_{2xb}$—O); ya is 1–10; za is 1–10; —$D^2$— is —CO—O—$C_{rc}H_{2rc}$, —O—$C_{rc}H_{2rc}$— —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N$(C_{pb}H_{2pb+1})$—$SO_2$—, —$C_{rc}H_{2rc}$—N$(C_{pb}H_{2pb+1})$—CO—, or a covalent bond, where rc and rd are independently 1–20; sa is independently 1–10 for each ($C_{sa}H_{2sa}$—O); ta is 1–6; and pb is 0–4.

It is particularly preferred to use a fluorine-containing mesomorphic compound of the following general formula (I) or general formula (II):

Formula (I):

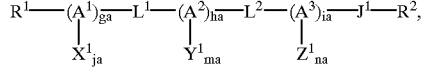

wherein $A^1$, $A^2$ and $A^3$ are each independently

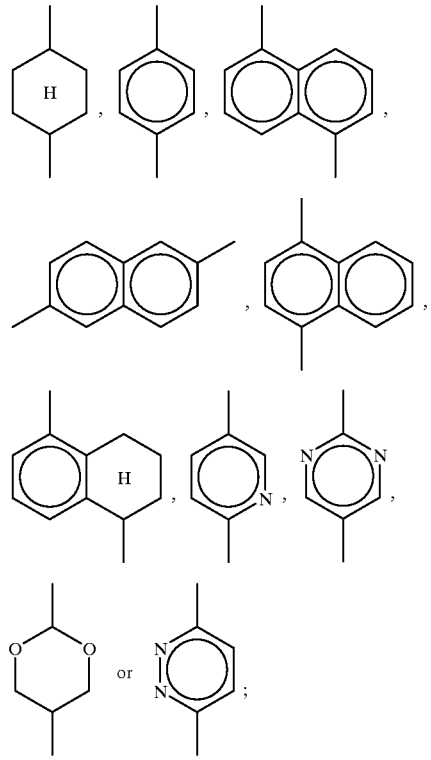

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N$(C_{pa}H_{2pa+1})$—$SO_2$— or —$(CH_2)_{ra}$—N$(C_{pa}H_{2pa+1})$—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{21qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

Formula (II):

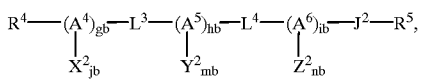

wherein $A^4$, $A^5$ and $A^6$ are each independently

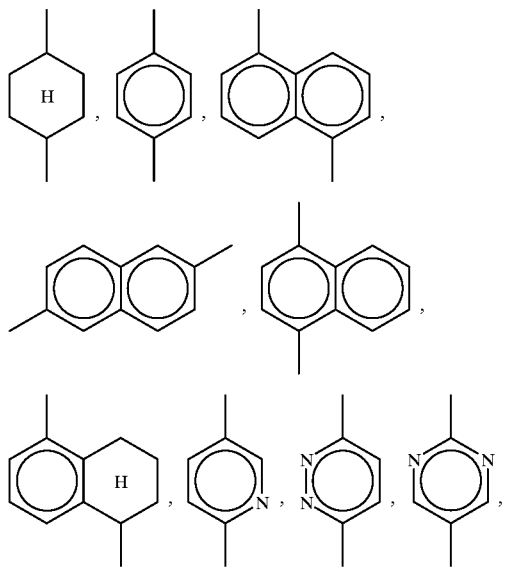

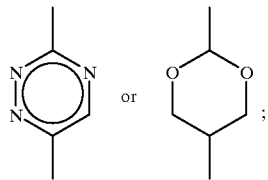

gb, hb and ib are each independently an integer of 0–3 with the proviso that the sum of gb+hb+ib be at least 2; each $L^3$ and $L^4$ are independently a covalent bond, —CO—O—, —O—CO—, —CO—S—, —S—CO—, —CO—Se—, —Se—CO—, —CO—Te—, —Te—CO—, —$(CH_2CH_2)_{ka}$—(ka is 1–4), —CH=CH—, —C≡C—, —CH=N—, —N=CH—, —$CH_2$—O—, —O—$CH_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —$OCH_3$, —$CH_3$, —$CF_3$, —O—$CF_3$, —CN or —$NO_2$; each jb, mb and nb are independently an integer of 0–4;

$J^2$ is —CO—O—$C_{rc}H_{2rc}$—, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N($C_{pb}H_{2pb+1}$)—$SO_2$— or —$C_{rc}H_{2rc}$—N($C_{pb}H_{2pb+1}$)—CO—; rc and rd are independently 1–20; sa is independently 1–10 for each ($C_{sa}H_{2sa}$—O), ta is 1–6; pb is 0–4;

$R^4$ is —O—$(C_{qc}H_{2qc}$—O$)_{wa}$—$C_{qd}H_{2qd+1}$, —$(C_{qc}H_{2qc}$—O$)_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may be either straight chain or branched; $R^6$ is —O—CO—$C_{qd}H_{2qd+1}$; —CO—O—$C_{qd}H_{2qd+1}$, —Cl, —F, —$CF_3$, —$NO_2$, —CN or —H; qc and qd are independently an integer of 1–20; wa is an integer of 1–10;

$R^5$ is $(C_{xb}F_{2xb}$—O$)_{za}$—$C_{ya}F_{2ya+1}$, wherein xb is independently 1–10 for each ($C_{xb}F_{2xb}$—O); ya is 1–10; and za is 1–10.

The compounds represented by the general formula (I) may be obtained through a process described in U.S. Pat. No. 5,082,587 (corr. to JP-A 2-142753). Specific examples thereof are enumerated below.

I-1

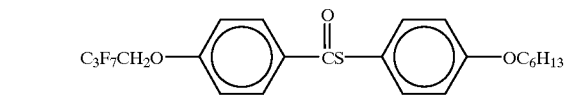

I-2

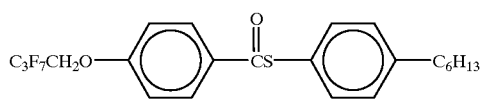

I-3

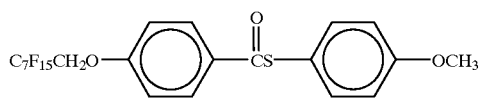

I-4

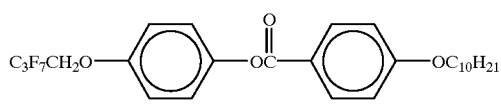

I-5
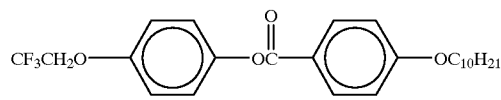
I-6
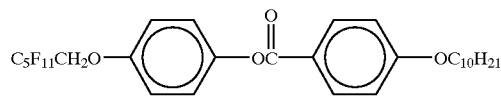
I-7
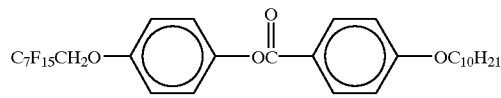
I-8
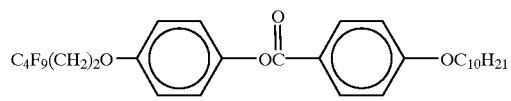
I-9
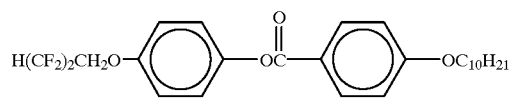
I-10
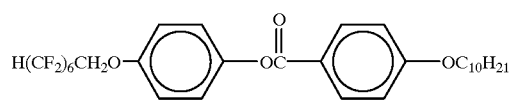
I-11
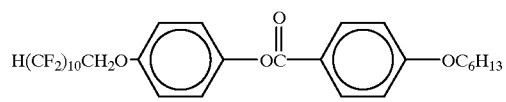
I-12
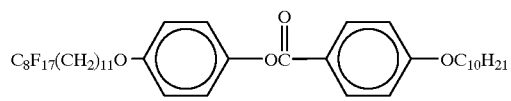
I-13
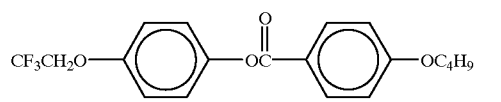
I-14
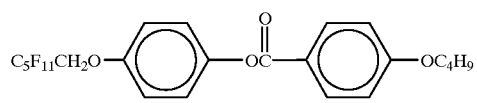
I-15
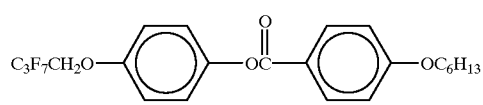
I-16
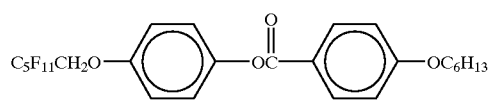
I-17
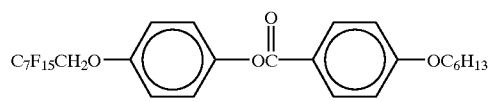

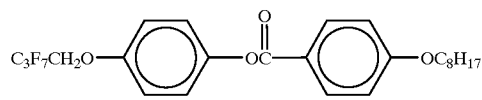
I-18
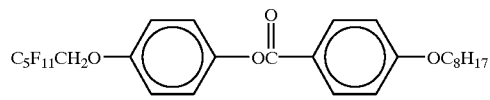
I-19
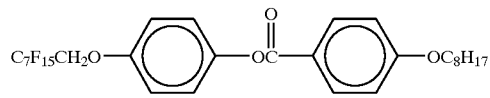
I-20
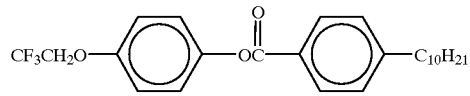
I-21
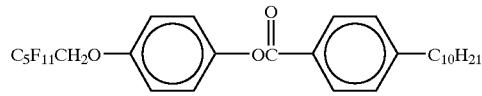
I-22
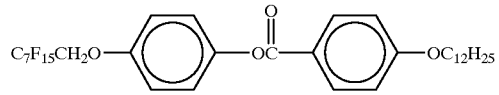
I-23
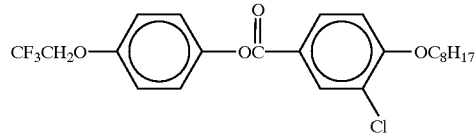
I-24
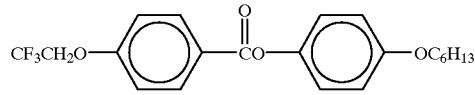
I-25
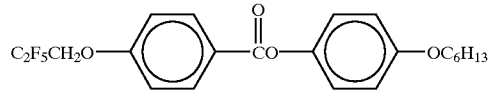
I-26
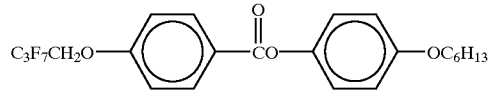
I-27
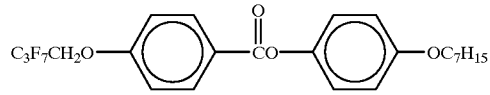
I-28
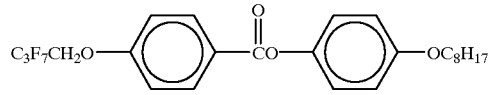
I-29
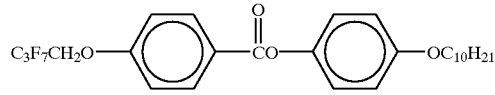
I-30

-continued
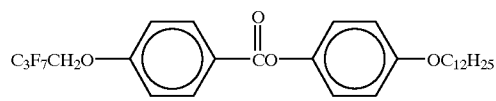
I-31
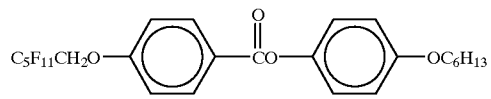
I-32
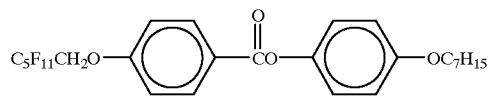
I-33
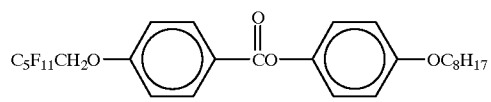
I-34
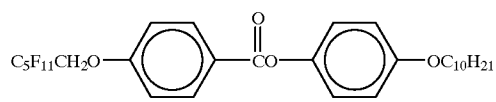
I-35
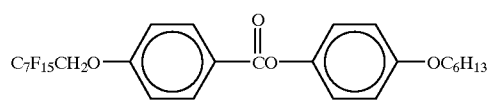
I-36
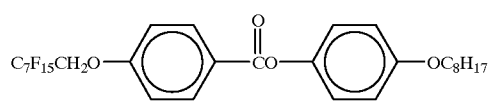
I-37
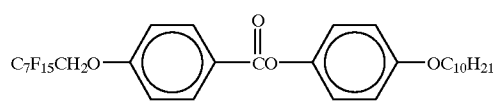
I-38
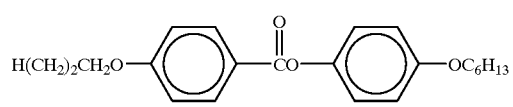
I-39
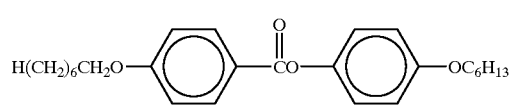
I-40
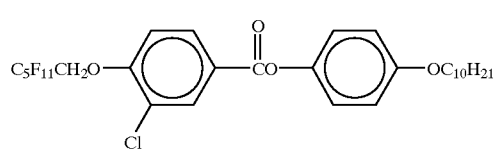
I-41
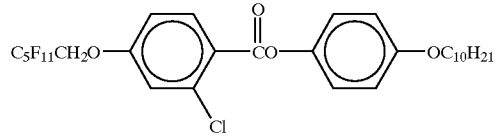
I-42

-continued
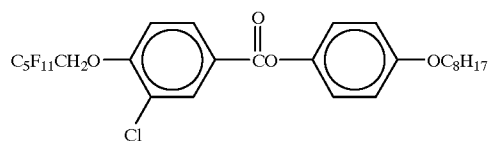 I-43
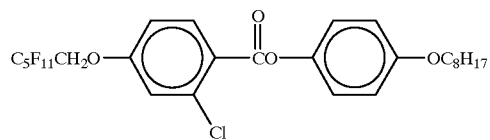 I-44
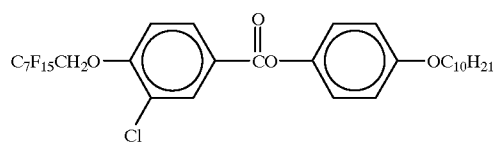 I-45
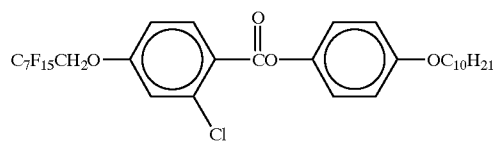 I-46
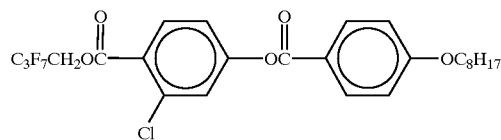 I-47
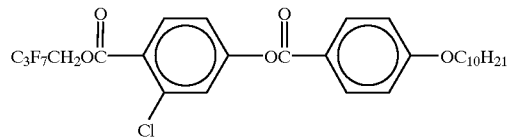 I-48
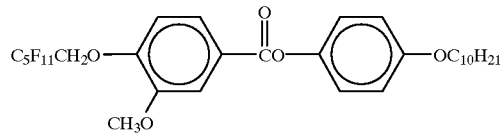 I-49
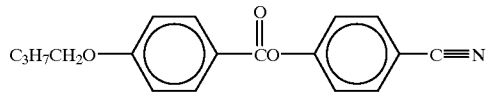 I-50
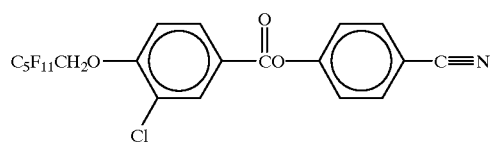 I-51
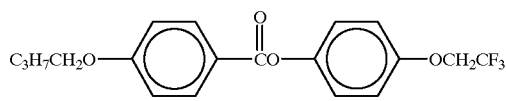 I-52

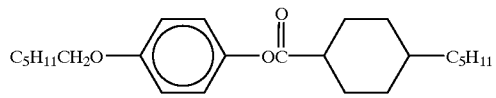
I-53
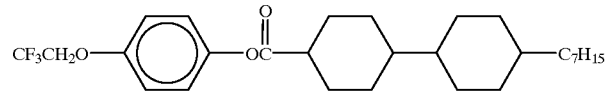
I-54
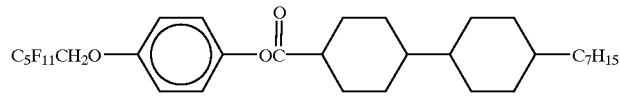
I-55
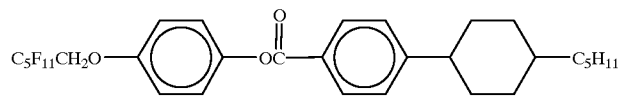
I-56
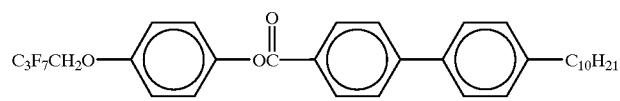
I-57
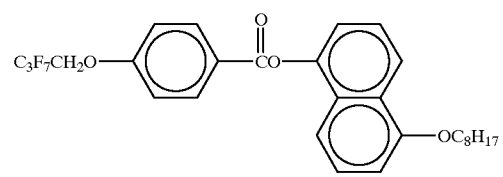
I-58
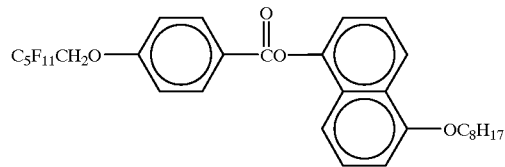
I-59
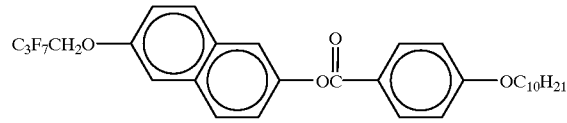
I-60
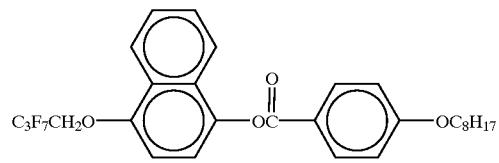
I-61
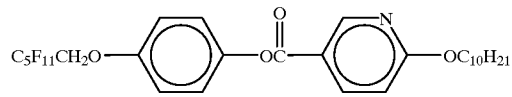
I-62
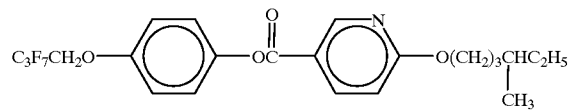
I-63

I-64
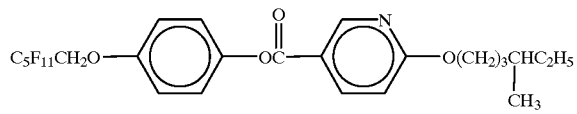
I-65
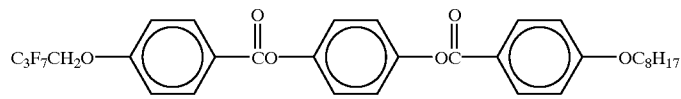
I-66
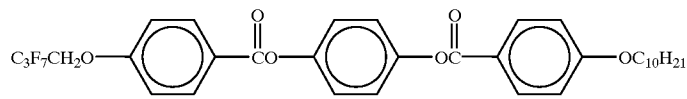
I-67
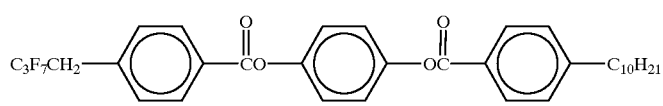
I-68
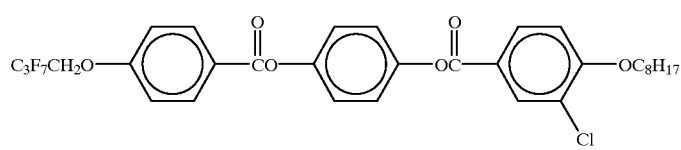
I-69
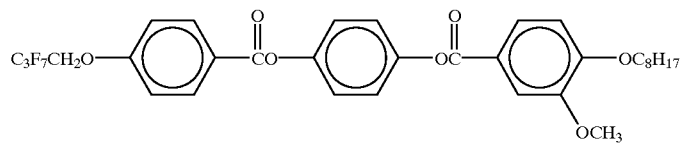
I-70
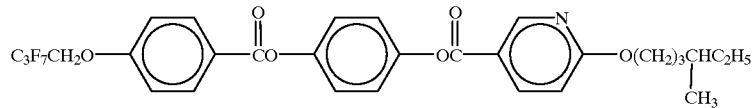
I-71
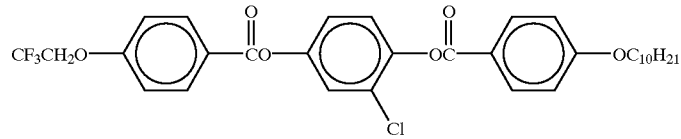
I-72
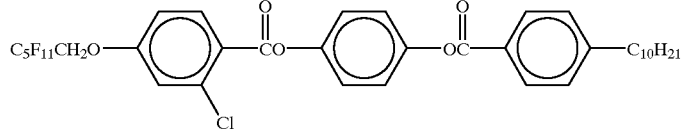
I-73
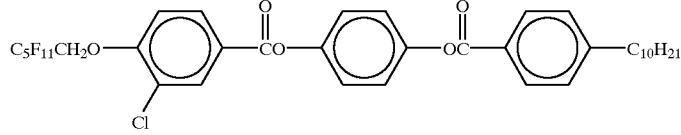
I-74

-continued
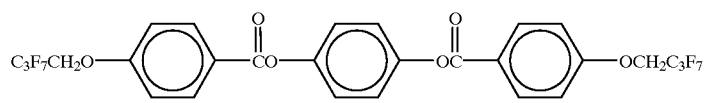
I-75
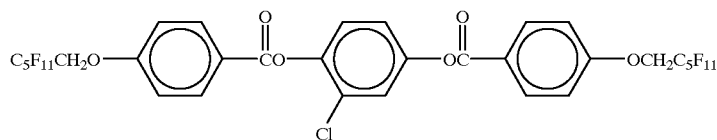
I-76
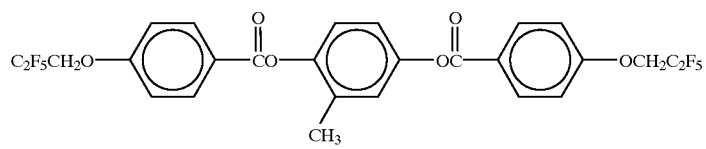
I-77
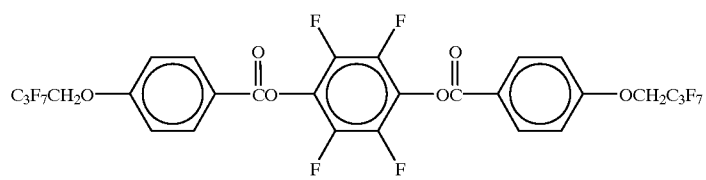
I-78
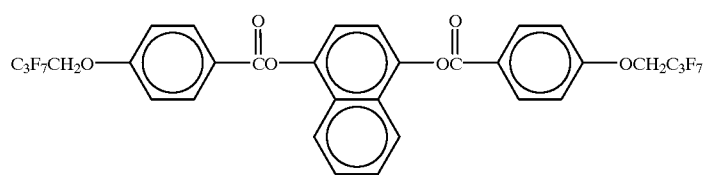
I-79
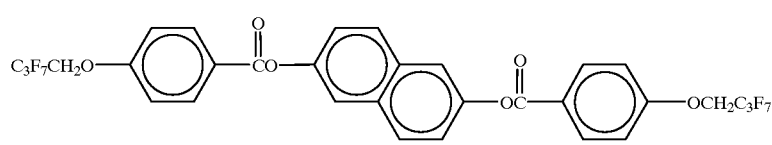
I-80
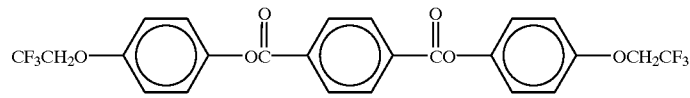
I-81
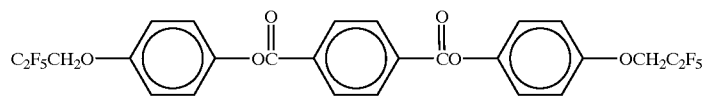
I-82
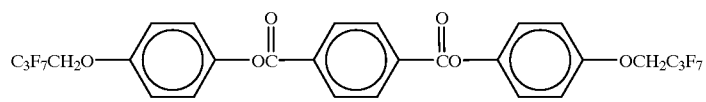
I-83
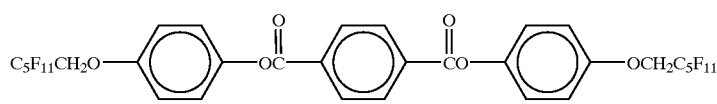
I-84
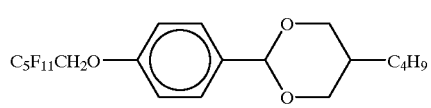
I-85

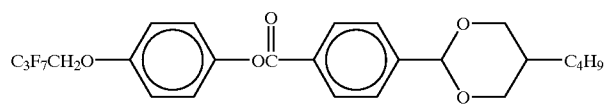 I-86
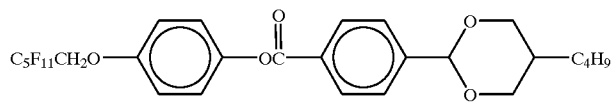 I-87
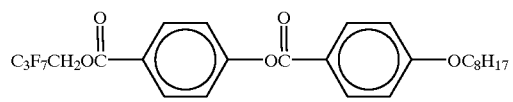 I-88
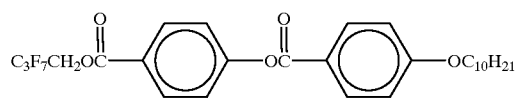 I-89
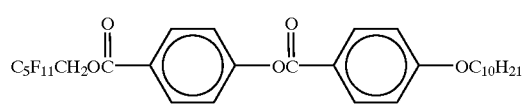 I-90
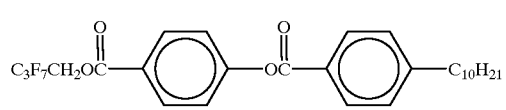 I-91
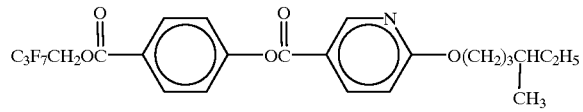 I-92
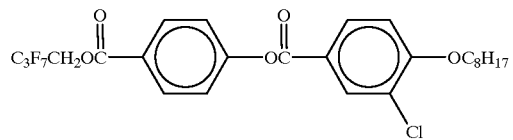 I-93
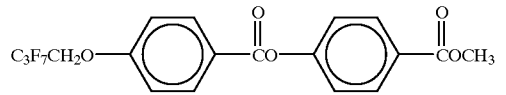 I-94
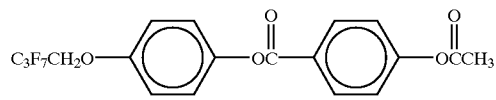 I-95
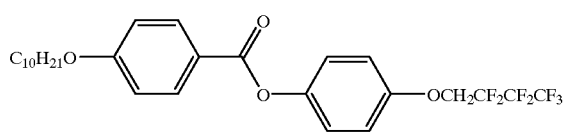 I-96
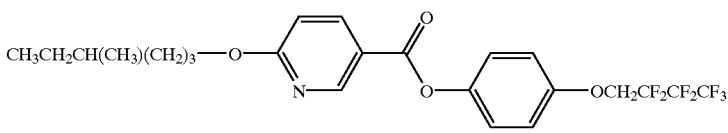 I-97

-continued
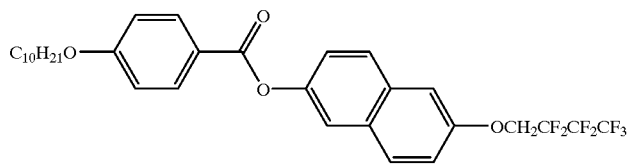
I-98
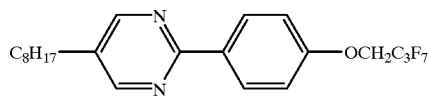
I-99
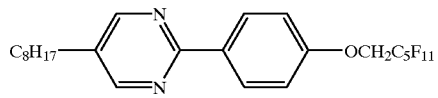
I-100
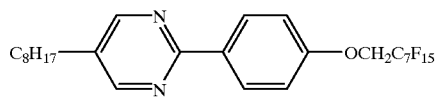
I-101
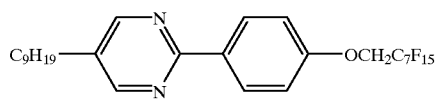
I-102
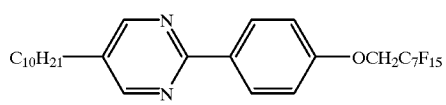
I-103
The compounds represented by the general formula (II) may be obtained though a process described in PCT Publication WO93/2396 (corr. to JP (Tokuhyo) 7-506368). Specific examples thereof are enumerated below.
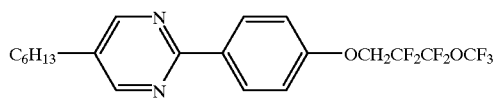
II-1
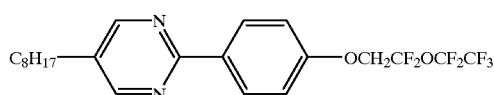
II-2
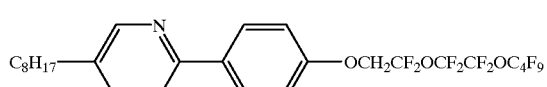
II-3
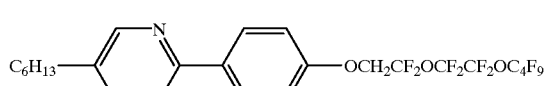
II-4
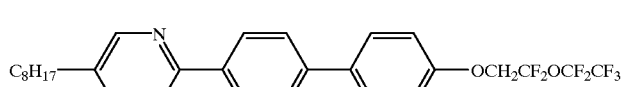
II-5
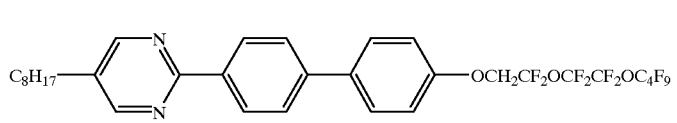
II-6

II-7
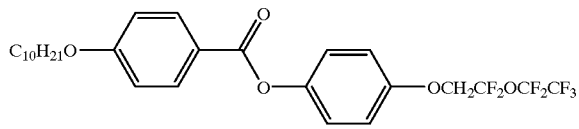
II-8
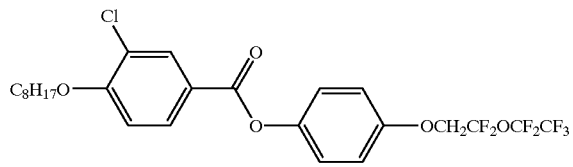
II-9
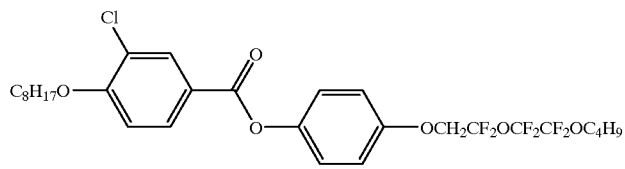
II-10
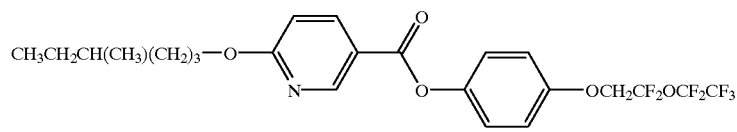
II-11
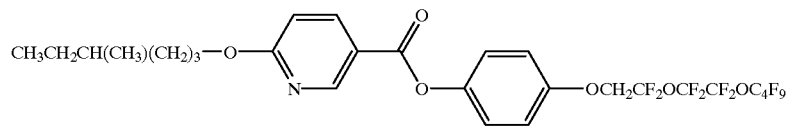
II-12
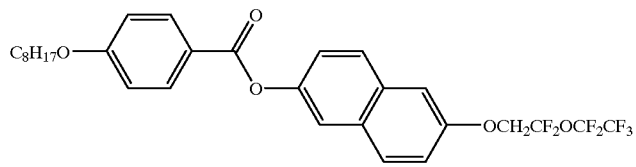
II-13
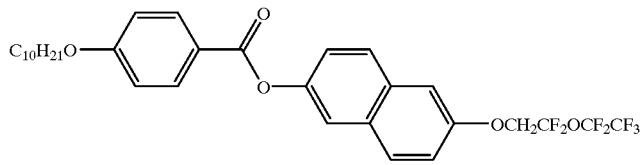
II-14
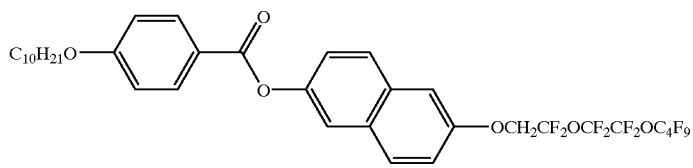
II-15
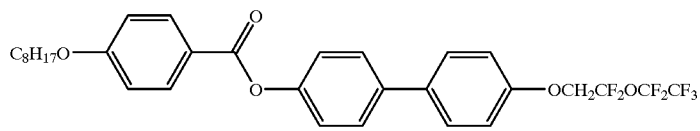

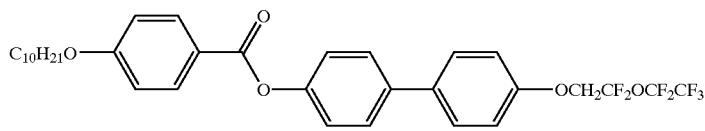
II-16
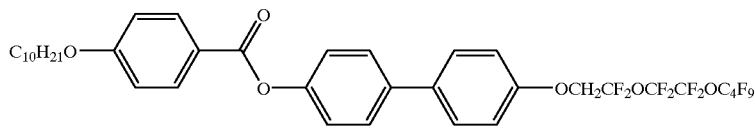
II-17
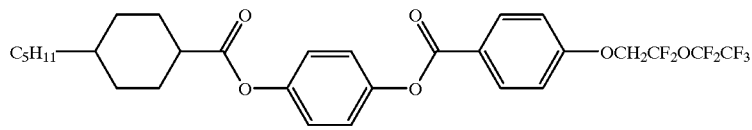
II-18
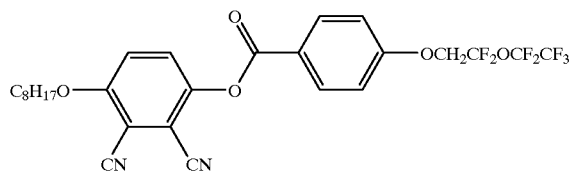
II-19
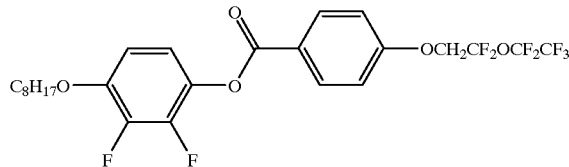
II-20
II-21
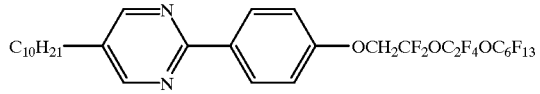
II-22
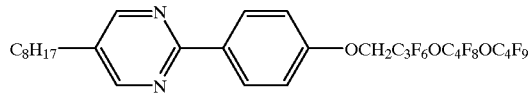
II-23
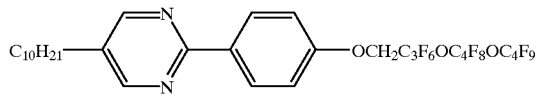
II-24
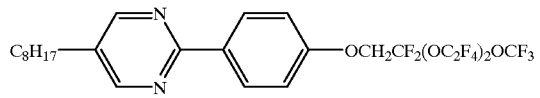
II-25
II-26
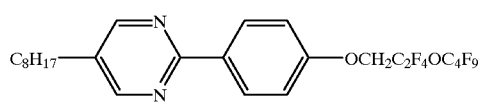
II-27

-continued
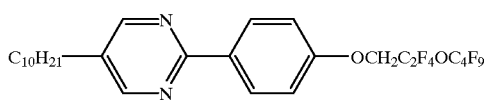
II-28
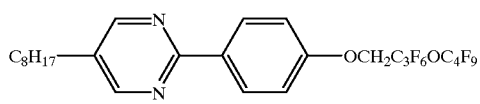
II-29
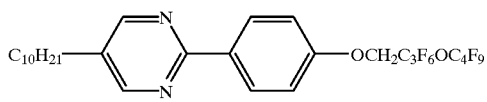
II-30
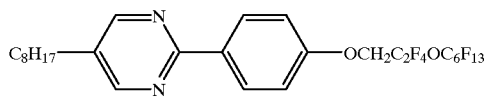
II-31
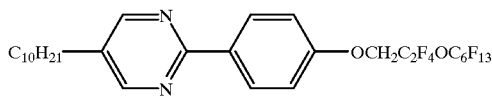
II-32
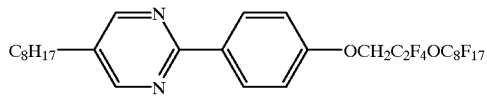
II-33
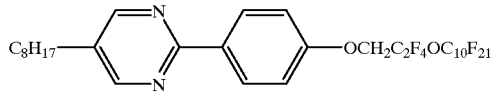
II-34
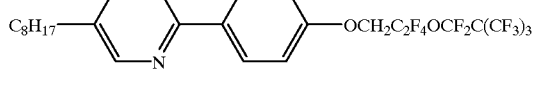
II-35
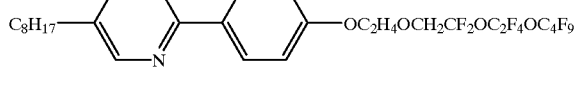
II-36
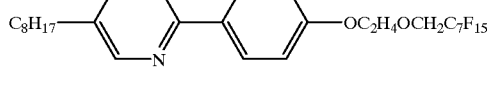
II-37
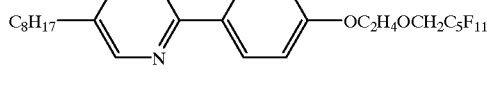
II-38
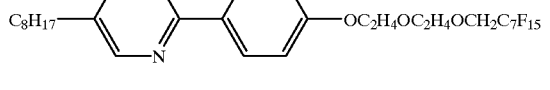
II-39
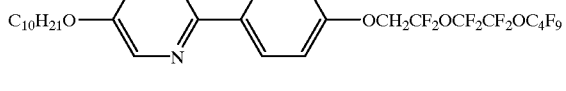
II-40
II-41

The liquid crystal composition used in the liquid crystal device according to the present invention may contain a so-called hydrocarbon-type mesomorphic compound having no fluoro-carbon chain in addition to the above-mentioned fluorine-containing mesomorphic compound.

Examples of such a hydrocarbon-type mesomorphic compound may include the following:

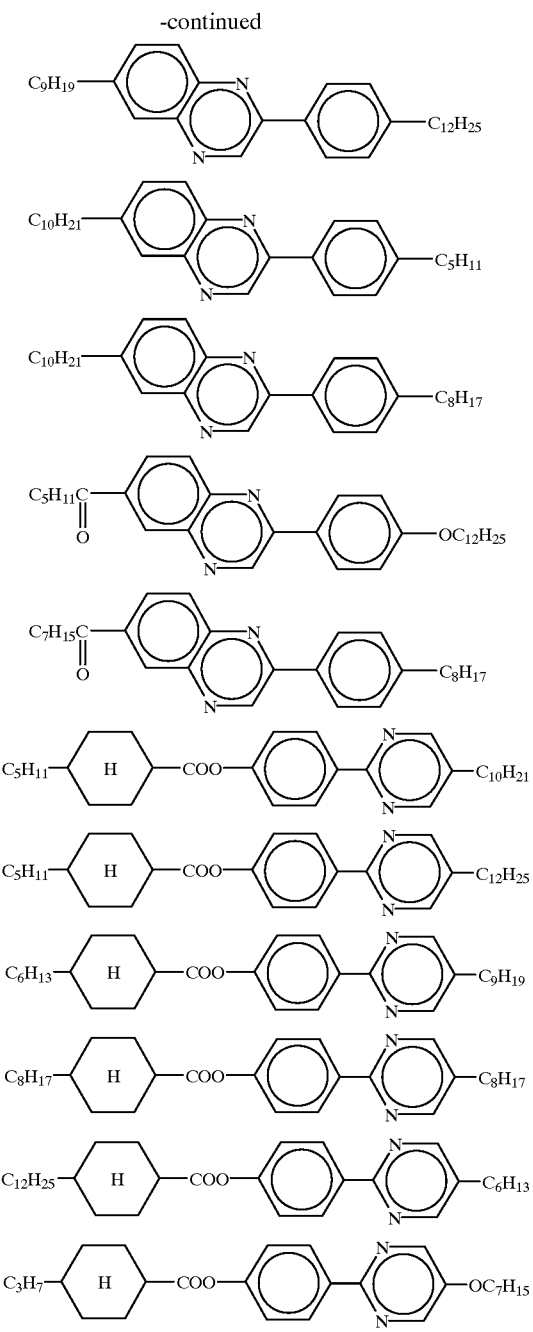

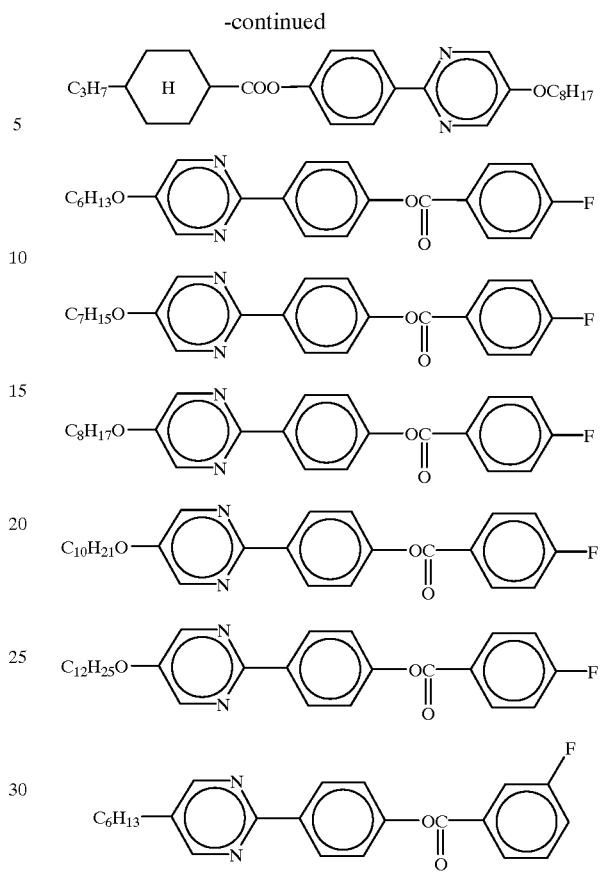

The liquid crystal composition assuming a chiral smectic phase used in the present invention is required to indispensably contain at least one species of optically active compound. Such an optically active compound may be selected from compounds having a chain or a ring including an optically active site in consideration of compatibility with other liquid crystal components, such as the above-mentioned fluorine-containing mesomorphic compound. Specific examples of such optically active compound may include compounds Nos. A-1 to A-105 shown in Table 1 supplemented with the general formula above Table A and denotations shown below Table A and some additional examples including Compounds C-1 to C-3, D-1 to D-17, E-1 to E-7 and those represented by additional formulae described below Table A.

TABLE A (for Compounds Nos. A-1 to A-105)
$R^{6"}-A^{6"}-X^{6"}-A^{7"}-A^{8"}-X^{7"}-R^{7"}-\Sigma^{**}-R^{9"}$

| No. | $R^{6"}$ | $A^{6"}$ | $X^{6"}$ | $A^{7"}$ | $A^{8"}$ | $X^{7"}$ | $R^{7"}$ | $\Sigma^{**}$ | $R^{8"}$ | $R^{9"}$ |
|---|---|---|---|---|---|---|---|---|---|---|
| 1 | $C_6H_{13}$ | — | — | Ph | Ph | — | M1 | Σ | H | $C_8H_{17}$ |
| 2 | $C_8H_{17}O$ | — | — | Ph | Ph | — | M1 | Σ | H | $C_{18}H_{37}$ |
| 3 | $C_5H_{11}O$ | — | — | Ph | Ph2F | — | M1 | Σ | H | $C_6H_{13}$ |
| 4 | $CH_3O$ | — | — | Ph | Ph | — | M1 | Σ | H | $C_6H_{13}$ |
| 5 | $C_6H_{13}CH(CH_3)(CH_2)_2O$ | — | — | Ph | Ph | — | M1 | Σ | H | $C_6H_{13}$ |
| 6 | $C_7H_{15}O$ | — | — | Ph | P23F | — | M1 | Σ | H | $C_6H_{13}$ |
| 7 | $C_6H_{13}$ | — | — | Ph | Ph | — | M1 | Σ | H | $C_9H_{19}$ |
| 8 | $C_7H_{15}O$ | — | — | Ph | Ph | — | M1 | Σ | H | $C_5H_{11}$ |
| 9 | $C_8H_{17}O$ | — | — | Ph | Ph | — | M1 | Σ | H | $C_6H_{13}$ |

TABLE A-continued (for Compounds Nos. A-1 to A-105)
$R^{6"}-A^{6"}-X^{6"}-A^{7"}-A^{8"}-X^{7"}-R^{7"}-\Sigma^{**}-R^{9"}$

| No. | $R^{6"}$ | $A^{6"}$ | $X^{6"}$ | $A^{7"}$ | $A^{8"}$ | $X^{7"}$ | $R^{7"}$ | $\Sigma^{**}$ | $R^{8"}$ | $R^{9"}$ |
|---|---|---|---|---|---|---|---|---|---|---|
| 10 | $C_8H_{17}$ | — | — | Pr1 | Ph | — | M1 | Σ | H | $C_8H_{17}$ |
| 11 | $C_{10}H_{21}$ | — | — | Pr2 | Ph | — | M1 | Σ | H | $C_4H_9$ |
| 12 | $C_{11}H_{23}$ | — | — | Pr2 | Ph | — | M1 | Σ | H | $C_6H_{13}$ |
| 13 | $C_{12}H_{25}$ | — | — | Pr2 | Ph | — | M1 | Σ | H | $C_8H_{17}$ |
| 14 | $C_4H_9O$ | — | — | Py1 | Ph | — | M1 | Σ | H | $C_{10}H_{21}$ |
| 15 | $C_{13}H_{27}$ | — | — | Py2 | Ph | — | M1 | Σ | H | $C_5H_{11}$ |
| 16 | $C_6H_{13}$ | — | — | Py2 | Ph | — | M1 | Σ | H | $C_8H_{17}$ |
| 17 | $C_6H_{13}CH(CH_3)CH_2O$ | — | — | Py2 | Ph | — | M1 | Σ | H | $C_9H_{19}$ |
| 18 | $C_5H_{11}O$ | — | — | Py2 | P23F | — | M1 | Σ | H | $C_4H_9$ |
| 19 | $C_{10}H_{21}$ | — | — | Py2 | Ph | — | M1 | Σ | H | $C_6H_{13}$ |
| 20 | $C_8H_{17}$ | — | — | Py2 | Ph3F | — | M1 | Σ | H | $C_8H_{17}$ |
| 21 | $C_6H_{13}$ | — | — | Cy | Ph | — | M1 | Σ | H | $C_4H_9$ |
| 22 | $C_3H_7$ | — | — | Cy | Ph | — | M1 | Σ | H | $C_5H_{11}$ |
| 23 | $C_5H_{11}$ | — | — | Cy | Ph | — | M1 | Σ | H | $C_{14}H_{29}$ |
| 24 | $C_{10}H_{21}$ | — | — | Cy | Ph | — | M1 | Σ | H | $C_{10}H_{21}$ |
| 25 | $C_6H_{13}$ | — | — | Pa | Ph | — | M1 | Σ | H | $C_{10}H_{21}$ |
| 26 | $C_7H_{15}OCO$ | — | — | Pd | Ph | — | M1 | Σ | H | $C_3H_7$ |
| 27 | $C_6H_{13}$ | — | — | Dt2 | Ph | — | M1 | Σ | H | $C_6H_{13}$ |
| 28 | $C_8H_{17}$ | — | — | Tn | Ph | — | M1 | Σ | H | $C_9H_{19}$ |
| 29 | $C_5H_{11}$ | — | — | Tz1 | Ph | — | M1 | Σ | H | $C_9H_{19}$ |
| 30 | $C_9H_{19}O$ | — | — | Tz2 | Ph | — | M1 | Σ | H | $C_6H_{13}$ |
| 31 | $C_2H_5$ | — | — | Td | Ph | — | M1 | Σ | H | $C_7H_{15}$ |
| 32 | $C_{10}H_{21}$ | — | — | Dx2 | Ph | — | M1 | Σ | H | $C_8H_{17}$ |
| 33 | $C_6H_{13}$ | — | — | Boa2 | Ph | — | M1 | Σ | H | $C_{10}H_{21}$ |
| 34 | $C_{15}H_{31}$ | — | — | Bob2 | Ph | — | M1 | Σ | H | $C_{10}H_{21}$ |
| 35 | $C_7H_{15}$ | — | — | Bta2 | Ph | — | M1 | Σ | H | $C_6H_{13}$ |
| 36 | $C_{16}H_{33}O$ | — | — | Btb2 | Ph | — | M1 | Σ | H | $C_9H_{19}$ |
| 37 | $C_6H_{13}$ | — | — | Np | Ph | — | M1 | Σ | H | $C_6H_{13}$ |
| 38 | $C_5H_{11}$ | — | — | Np | Ph | — | Cb | Σ | H | $C_4H_9$ |
| 39 | $C_8H_{17}CH(CH_3)CH_2O$ | — | — | Ep1 | Ph | — | Cb | Σ | H | $C_6H_{13}$ |
| 40 | $C_4H_9$ | — | — | Ep2 | Ph | — | M1 | Σ | H | $C_8H_{17}$ |
| 41 | $C_6H_{13}$ | — | — | Gp1 | Ph | — | M1 | Σ | H | $C_6H_{13}$ |
| 42 | $C_7H_{15}$ | — | — | Gp2 | Ph | — | M1 | Σ | H | $C_{12}H_{25}$ |
| 43 | $C_6H_{13}$ | — | — | Cm1 | Ph | — | M1 | Σ | H | $C_{10}H_{21}$ |
| 44 | $C_8H_{17}$ | — | — | Io1 | Ph | — | M1 | Σ | H | $C_{12}H_{25}$ |
| 45 | $C_{18}H_{37}$ | — | — | Id1 | Ph | — | M1 | Σ | H | $C_6H_{13}$ |
| 46 | $C_{11}H_{23}$ | — | — | Id1 | Ph | — | M1 | Σ | H | $C_5H_{11}$ |
| 47 | $C_8H_{17}$ | — | — | Id1 | Ph | — | M1 | Σ | H | $C_5H_{11}$ |
| 48 | $C_5H_{11}$ | — | — | Id1 | Ph2F | — | M1 | Σ | H | $C_6H_{13}$ |
| 49 | $C_6H_{13}$ | — | — | Tn | Ph | — | M1 | Σ | H | $C_6H_{13}$ |
| 50 | $C_4H_9O$ | — | — | Tz2 | Ph | — | M1 | Σ | H | $C_8H_{17}$ |
| 51 | $C_{12}H_{25}$ | — | — | Btb2 | Ph | — | M1 | Σ | H | $C_{10}H_{21}$ |
| 52 | $C_6H_{13}O$ | — | — | Btb2 | Ph | — | M1 | Σ | H | $C_6H_{13}$ |
| 53 | $CH_2=CH(CH_2)_3O$ | — | — | Ep2 | Ph | — | M1 | Σ | H | $C_5H_{11}$ |
| 54 | $C_9H_{19}$ | — | — | Gp2 | Ph | — | M1 | Σ | H | $C_6H_{13}$ |
| 55 | $C_5H_{11}$ | — | — | Np | Ph | — | M1 | Σ | H | $C_6H_{13}$ |
| 56 | $C_6H_{13}$ | Ph | — | Ph | Ph | Cb | M1 | Σ | H | $C_6H_{13}$ |
| 57 | $C_8H_{17}COO$ | Pr2 | — | Ph | Ph | — | M1 | Σ | H | $C_5H_{11}$ |
| 58 | $C_3H_7$ | Py2 | — | Ph | Ph | — | M1 | Σ | H | $C_4H_9$ |
| 59 | $C_5H_{11}$ | — | — | Ha2 | Ph | — | M1 | Σ | H | $C_4H_9$ |
| 60 | $C_6H_{13}$ | Ph | COO | Pr2 | Ph | — | M1 | Σ | H | $C_6H_{13}$ |
| 61 | $C_9H_{19}$ | Ph | — | Pr1 | Ph | — | Cb | Σ | H | $C_6H_{13}$ |
| 62 | $C_{13}H_{27}$ | Ph | — | Cy | P3Br | M1 | Cb | Σ | H | $C_5H_{11}$ |
| 63 | $C_{10}H_{21}O$ | Ph | OCO | Py1 | Ph | — | M1 | Σ | My | $C_6H_{13}$ |
| 64 | $C_7H_{15}$ | Ph | — | Py2 | Ph | — | M1 | Σ | H | $C_5H_{11}$ |
| 65 | $C_4H_9$ | Ph3TF | COO | Pa | Ph | — | M1 | Σ | H | $C_6H_{13}$ |
| 66 | $CH_3$ | — | — | Hb2 | Ph | — | M1 | Σ | H | $C_8H_{17}$ |
| 67 | $C_8H_{17}$ | Ph | — | Tn | Ph | — | M1 | Σ | H | $(CH_2)_3CH(CH_3)_2$ |
| 68 | $C_2H_5$ | Ph | — | Tz1 | Ph2M | — | M1 | Σ | H | $C_8H_{17}$ |
| 69 | $C_6H_{13}$ | Ph | — | Ph | Ph | — | M1 | Σ | H | $C_8H_{17}$ |
| 70 | $C_{10}H_{21}$ | Ph | — | Td | Ph | — | M1 | Σ | H | $(CH_2)_3CH(CH_3)_2$ |
| 71 | $C_{10}H_{21}$ | — | — | Ph | Py1 | — | M1 | Σ | H | $C_6H_{13}$ |
| 72 | $C_6H_{13}$ | — | — | Ph | Py1 | — | M1 | Σ | H | $C_4H_9$ |
| 73 | $C_6H_{13}OCO$ | — | — | Ph | Py1 | — | M1 | Σ | H | $C_6H_{13}$ |
| 74 | $C_7H_{15}$ | — | — | Ph | Pr2 | — | M1 | Σ | H | $C_5H_{11}$ |
| 75 | $C_9H_{19}$ | — | — | Ph | Pr2 | — | M1 | Σ | H | $(CH_2)_3CH(CH_3)_2$ |
| 76 | $C_7H_{15}$ | — | — | Ph | Pr2 | — | M1 | Σ | H | $C_6H_{13}$ |
| 77 | $C_5H_{11}O$ | — | — | Py2 | Cy | — | M1 | Σ | H | $C_{10}H_{21}$ |
| 78 | $C_4H_9$ | — | — | Ph | Cy | — | M1 | Σ | H | $C_{12}H_{25}$ |
| 79 | $C_{12}H_{25}$ | — | — | Ph | Cy | — | M1 | Σ | H | $C_5H_{11}$ |
| 80 | $C_6H_{13}C\equiv C$ | — | — | Ph | Pa | — | M1 | Σ | H | $C_{10}H_{21}$ |
| 81 | $C_8H_{17}O$ | — | — | Ph | Pd | — | M1 | Σ | My | $C_6H_{13}$ |
| 82 | $C_3H_7$ | — | — | P2Cl | Tn | — | M1 | Σ | H | $C_{10}H_{21}$ |
| 83 | $C_4H_9$ | — | — | Ph | Tn | — | M1 | Σ | H | $C_8H_{17}$ |

TABLE A-continued (for Compounds Nos. A-1 to A-105)
$R^{6"}—A^{6"}—X^{6"}—A^{7"}—A^{8"}—X^{7"}—R^{7"}-\Sigma^{**}-R^{9"}$

| No. | $R^{6"}$ | $A^{6"}$ | $X^{6"}$ | $A^{7"}$ | $A^{8"}$ | $X^{7"}$ | $R^{7"}$ | $\Sigma^{**}$ | $R^{8"}$ | $R^{9"}$ |
|---|---|---|---|---|---|---|---|---|---|---|
| 84 | $C_8H_{17}$ | — | — | Ph | Tz1 | — | M1 | Σ | H | $C_8H_{17}$ |
| 85 | $C_4H_9OCH(CH_3)COO$ | — | — | Ph | Tz1 | — | M1 | Σ | H | $C_7H_{15}$ |
| 86 | $C_6H_{13}$ | — | — | Ph2F | Td | — | M1 | Σ | My | $(CH_2)_3CH(CH_3)C_6H_{13}$ |
| 87 | $C_5H_{11}$ | — | — | Py2 | Np | — | M1 | Σ | H | $C_9H_{19}$ |
| 88 | $CH_3$ | — | — | Ph | Np | — | M1 | Σ | H | $C_{12}H_{25}$ |
| 89 | $C_{11}H_{23}$ | — | — | Ph | Np | — | M1 | Σ | H | $C_6H_{13}$ |
| 90 | $C_5H_{11}$ | — | — | Py1 | Ep1 | — | M1 | Σ | H | $C_5H_{11}$ |
| 91 | $C_8H_{17}OC_2H_4$ | — | — | Ph | Ep1 | — | M1 | Σ | H | $C_5H_{11}$ |
| 92 | $C_6H_{13}$ | — | — | Ph | Ep1 | — | M1 | Σ | H | $C_8H_{17}$ |
| 93 | $C_9H_{19}$ | — | — | Py1 | Gp1 | — | M1 | Σ | H | $C_5H_{11}$ |
| 94 | $C_8H_{17}$ | — | — | Ph | Gp1 | — | M1 | Σ | H | $C_6H_{13}$ |
| 95 | $C_3H_7COO$ | — | — | Ph | Gp1 | — | M1 | Σ | H | $C_8H_{17}$ |
| 96 | $C_4H_9$ | — | — | Ph | Id1 | — | M1 | Σ | H | $C_8H_{17}$ |
| 97 | $C_{12}H_{25}$ | — | — | Ph | Io1 | Cb | M1 | Σ | H | $C_6H_{13}$ |
| 98 | $C_{10}H_{21}$ | — | — | Ph | Cm1 | — | M1 | Σ | H | $C_8H_{17}$ |
| 99 | $C_6H_{13}$ | — | — | Ph | Ph | — | M1 | Σ | H | $C_8H_{17}$ |
| 100 | $C_3H_7$ | Ph | $OCH_2$ | Ph | Py1 | — | M1 | Σ | H | $C_{12}H_{25}$ |
| 101 | $C_4H_9$ | Ph2CN | — | Ph | Pr1 | — | M1 | Σ | H | $C_{10}H_{21}$ |
| 102 | $C_5H_{11}$ | Ph | $CH_2O$ | Ph3F | Tz1 | Cb | M1 | Σ | H | $C_6H_{13}$ |
| 103 | $C_6H_{13}$ | Ph | — | Ph | Tn | — | M1 | Σ | H | $C_8H_{17}$ |
| 104 | $C_7H_{15}$ | Tn | — | Ph | Py1 | — | M1 | Σ | H | $C_8H_{17}$ |
| 105 | $C_{10}H_{21}$ | Ph | — | Ph | Cy1 | — | M1 | Σ | H | $C_5H_{11}$ |

In Table A, the respective abbreviations (symbols) mean the following groups, respectively.

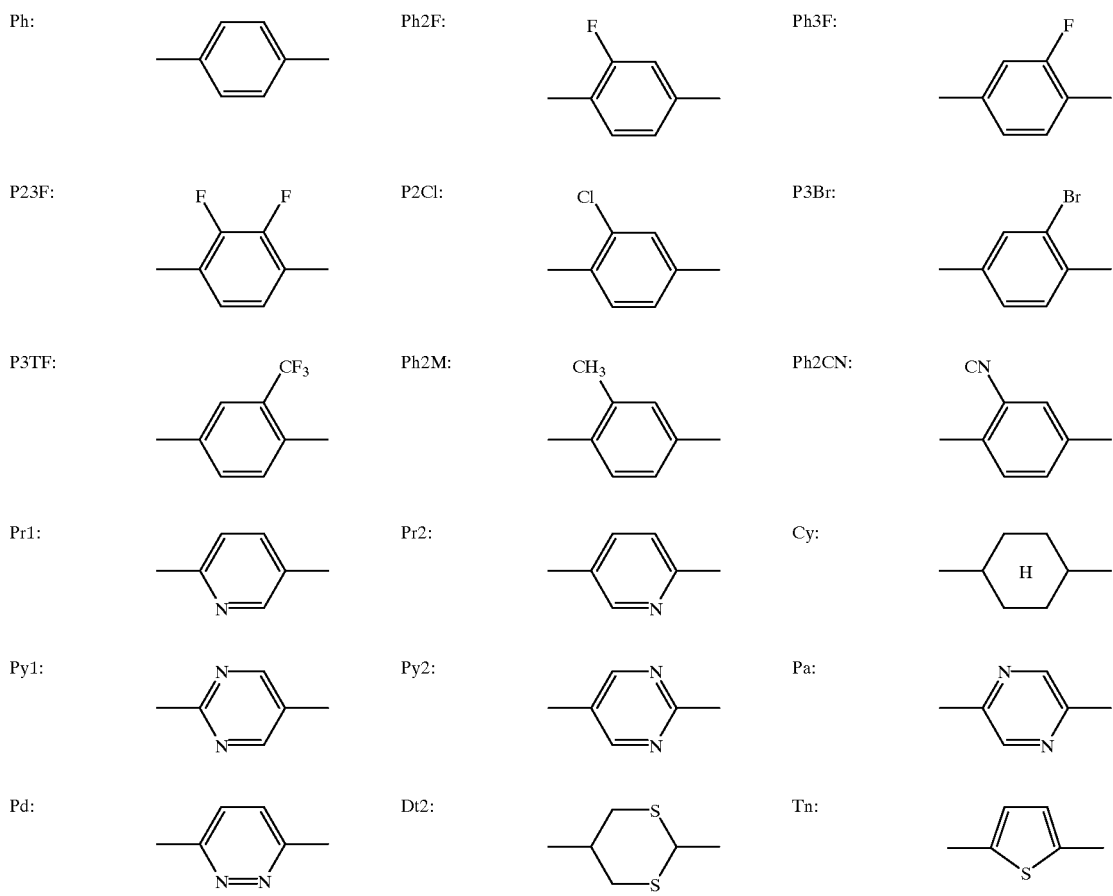

-continued
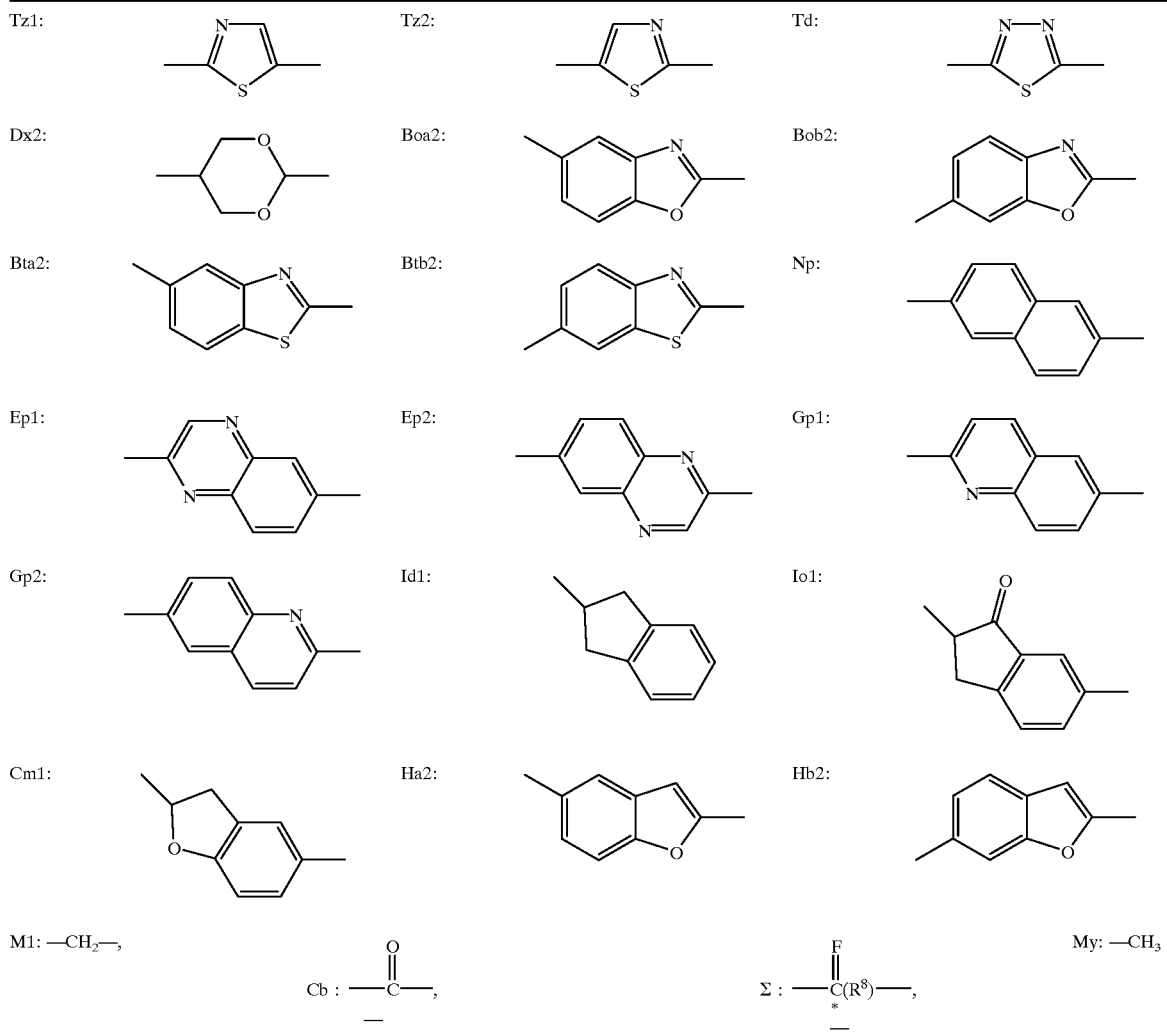
M1: —CH$_2$—,  Cb: —C(=O)—,  Σ: —C(R$^8$)(F)—*—,  My: —CH$_3$
C-1 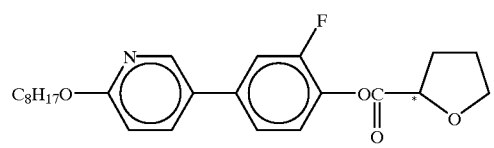
C-2 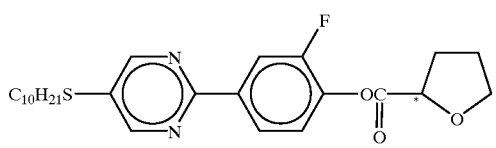
C-3 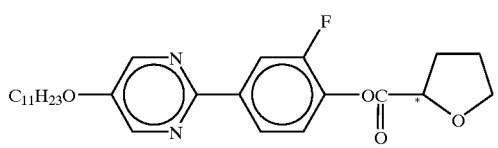
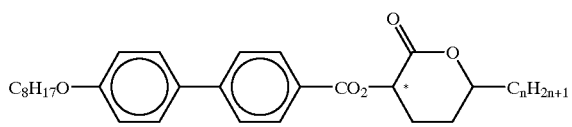

D-1: n = 6, 2R, 5R
D-2: n = 6, 2S, 5R
D-3: n = 4, 2R, 5R
D-4: n = 4, 2S, 5R
D-5: n = 3, 2R, 5R
D-6: n = 2, 2S, 5R
D-7: n = 2, 2R, 5R
D-8: n = 1, 2S, 5R
D-9: n = 1, 2R, 5R
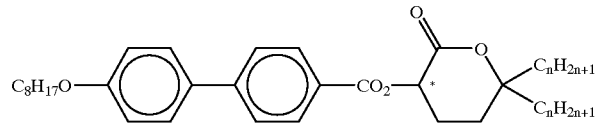
D-10: n = 1
D-11: n = 2
D-12: n = 3
D-13: n = 4
D-14: n = 6
D-15: n = 10
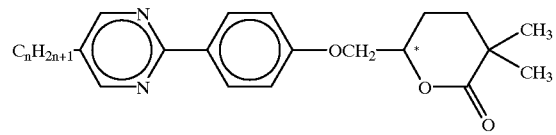
D-16: n = 8
D-17: n = 10
E-1: (2,5-cis)
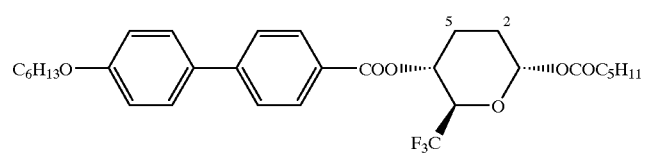
E-2: (2,5-cis)
E-3: (2,5-trans)
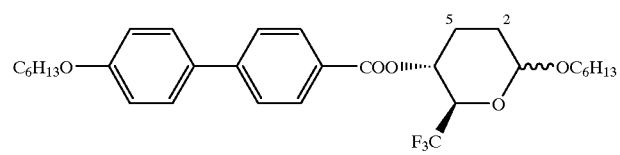
E-4: (2,5-cis)
E-5: (2,5-trans)
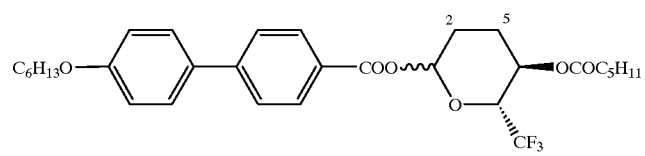
E-6: (2,5-cis)
E-7: (2,5-trans)
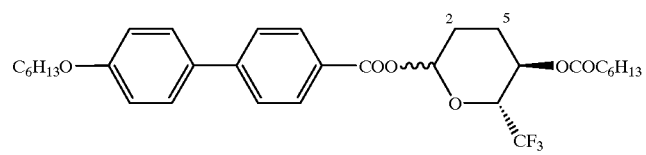
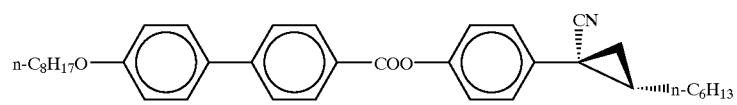

-continued

[Chemical structures:

n-C$_8$H$_{17}$O-CH(*)-COO-⟨phenyl⟩-⟨phenyl⟩-COO-⟨phenyl⟩-C(CN)(cyclopropyl)-n-C$_6$H$_{13}$ n-C$_8$H$_{17}$O-⟨phenyl⟩-⟨phenyl⟩-COO-⟨phenyl⟩-C(F)(cyclopropyl)-CH$_2$-O-n-C$_6$H$_{13}$ n-C$_8$H$_{17}$O-⟨phenyl⟩-⟨phenyl⟩-COO-⟨phenyl⟩-C(F)(cyclopropyl)-CH$_2$-O-n-C$_6$H$_{13}$]

[General structure: $R_{11}-R_{12}-$⟨phenyl⟩$-OCH_2-$(4*)(2*)-lactone ring$-R_{13}$]

| $R_{11}$ | $R_{12}$ | $R_{13}$ | Configuration |
|---|---|---|---|
| cyclohexyl | $C_6H_{11}$ | $C_4H_9$ | 2S, 4S (cis) |
| cyclohexyl | $C_6H_{11}$ | $C_4H_9$ | 2R, 4S (trans) |
| phenyl | $C_8H_{17}$ | $C_3H_7$ | 2S, 4S (cis) |
| phenyl | $C_8H_{17}$ | $C_3H_7$ | 2R, 4S (trans) |
| pyrimidinyl | $C_8H_{17}O$ | $C_4H_9$ | 2S, 4S (cis) |
| pyrimidinyl | $C_8H_{17}O$ | $C_4H_9$ | 2R, 4S (trans) |

The liquid crystal composition assuming a chiral smectic phase may further contain additives, such as a dye, a pigment, an antioxidant and an ultraviolet absorbing agent, as desired.

The liquid crystal device according to the present invention may be used to constitute liquid crystal apparatus having various functions, a most suitable example of which may be a liquid crystal display apparatus including the device in the form of a display panel and drive means therefor based on data format comprising picture data including scanning line address data and a communication synchronizing scheme using a SYNC signal.

Hereinbelow, the present invention will be described more specifically based on Examples.

Volume resistivities and surface energies described with reference to layer formed in Examples are based on values described in the following manner.

(Volume resistivity)

A volume resistivity as a bulk property of a layer included in a liquid crystal device is determined based on a resistance in the thickness direction of a sample layer measured in a system as shown in FIG. 3.

Referring to FIG. 3, a sample layer 11 is formed by using a material identical to that forming a layer concerned in a liquid crystal device in an actual thickness for an electrical property control layer or an increased thickness of ca. 1000 Å for an alignment control layer on an ITO electrode 13 on a glass substrate 10, and an Al electrode 12 of 1 mm in diameter is vapor-deposited on the sample layer 11. The measurement is made by applying a voltage between the electrodes 12 and 13 to measure a current flowing across the sample layer, whereby an objective volume resistivity is calculated from the thickness of the sample layer, the applied voltage and the measured current.

(Surface energy)

A contact angle measurement apparatus ("Model CA-DT", available from Kyowa Kaimen Kagaku K.K.) is used.

For a surface energy measurement in general, a sample film (layer) is formed on a glass substrate and drops of α-bromonaphthalene, methylene iodide and pure water are dripped on the film to measure contact angles θ1, θ2 and θ3, respectively, with the sample film. The measured values of θ1, θ2 and θ3 are substituted into the following formulae to calculate a dispersion term $\gamma_s^d$, a polarity term $\gamma_s^p$ and a hydrogen bond term $\gamma_p^h$, respectively, of the surface energy of the film. Herein, the surface energy is evaluated in terms of the dispersion term alone based on the first, as it has been experimentally observed that the polarity term or hydrogen bond term does not have a substantial interaction with the uniform liquid crystal alignment performance of an alignment control layer.

$$\sqrt{\gamma_s^d} = \frac{1}{2}\sqrt{44.6}\,(1+\cos\theta_1)$$

$$\sqrt{\gamma_s^p} = \frac{(46.8+4.0)(1+\cos\theta_2)-2\sqrt{46.8}\,\sqrt{\gamma_s^d}}{2\sqrt{4.0}}$$

$$\sqrt{\gamma_s^h} = \frac{(29.1+1.3+42.4)(1+\cos\theta_3)-2\sqrt{29.1}\,\sqrt{\gamma_s^d}-2\sqrt{1.3}\,\sqrt{\gamma_s^p}}{2\sqrt{42.4}}$$

wherein 44.6 is a surface energy of α-bromonaphthalene; 46.8, a dispersion term of surface energy of methylene iodide; 4.0, a polarity term of surface energy of methylene iodide; 29.1, a dispersion term of surface energy of pure energy; 1.3, a polarity term of surface energy of pure water; and 44.2, a hydrogen bond term of surface energy of pure water.

EXAMPLE 1

A liquid crystal device having a structure as shown in FIG. 2 was prepared in the following manner.

Glass substrates 201 and 202 were respectively coated with a 700 Å-thick ITO film showing a volume resistivity of $1.0\times10^1$ ohm.cm by sputtering of an ITO target in a DC sputtering apparatus at a discharge power of 1 W/cm² for 2.5 min. under flowing of sputtering gases of Ar at a rate of 90 SCCM and $O_2$ at a rate of 10 SCCM. Thereafter, the ITO films were patterned into strip electrodes 203 and 204, respectively, by an ordinary wet etching process.

Then, the substrates 201 and 202 provided with the electrodes 203 and 204 were respectively coated with a solution of ladder-form polysiloxane binder in butanol further containing ca. 100 Å-dia. Sb-doped $SnO_x$ ultra-fine particles (solid matter content=10 wt. %, particle/binder weight ratio=60/40) by spin coating at 1000 rpm for 10 sec., followed by baking at 200° C. for 60 min. to provide 2500 Å-thick films corresponding to an electrical property control layer 205 and an alignment control layer 206 which respectively showed a surface energy of 30 dyne/cm and a volume resistivity of $1.0\times10^5$ ohm.cm.

Then, the substrate 201 provided with the electrical property control layer 205 was further coated with a 0.5 wt. %-: solution of a precursor of a polyimide represented by the following structured formula in a 2/1-mixture solvent of NMP (N-methylpyrrolidone)/nBC (n-butyl cellosolve) by spin coating at 500 rpm for 15 sec. and 1500 rpm for 30 sec., followed by baking at 200° C. for 60 min. to form a 50 Å-thick polyimide film.

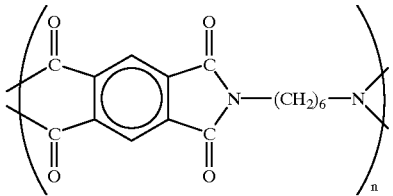

The polyimide film on the substrate 1 was further subjected to a rubbing treatment comprising two times of rubbing in one direction at a revolution speed of 1000 rpm, a pressing depth of 0.4 mm and a feed speed of 50 mm/sec., to obtain an alignment control layer 207, which exhibited a volume resistivity of $1.0\times10^{13}$ ohm.cm and a surface energy of 45 dyne/cm.

A dispersion of 2.4 μm-dia. $SiO_2$ beads in isopropanol was applied by spin coating over the alignment control layer 207 on the substrate 201 and heated at 120° C. for 10 min. to distribute the $SiO_2$ beads at a density of 300 beads/mm².

On the other hand, an epoxy sealing agent was applied by printing along a periphery except for a part providing a liquid crystal injection port on the substrate 202 provided with the alignment control layer 206 not subjected to a uniaxial aligning treatment and prebaked at 90° C. for 5 min. Then, the substrate 202 thus provided with a layer structure was superposed with the substrate 201, and these substrates were bonded to each other under a pressure of 50 g-f/cm² by a pressing machine. Further, under application of the same pressure by air cushion, the substrates were heated at 150° C. for 90 min. to form a blank cell wherein the sealing agent was cured. Then, the blank cell was placed in an ordinary load lock-type vacuum chamber, which was then evacuated to a vacuum of $1.0\times10^{-5}$ Torr. Then, the injection port of the cell was dipped within a liquid crystal in a reservoir heated at 105° C. under a vacuum of $1.0\times10^{-2}$ Torr to inject the liquid crystal into the cell, and the cell was cooled to room temperature, followed by sealing of the injection port.

Then, the cell was placed between a pair of polarizers to form a liquid crystal device. As a result of microscopic observation, the liquid crystal in the device exhibited a uniform alignment state. Incidentally, the liquid crystal used in this example was a liquid crystal composition which was a mixture of the following compounds A–E in indicated weight ratios.

(Compounds)

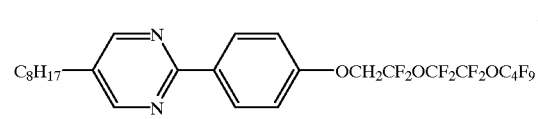

A

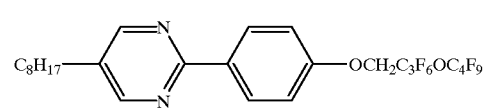

B

-continued

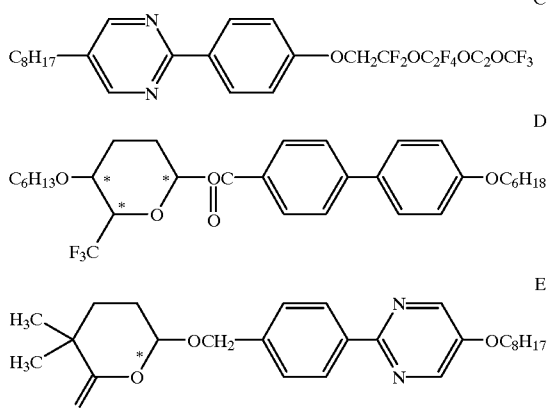

(weight ratio: A/B/C/D/E = 45/15/30/5/2)

The liquid crystal composition exhibited the following properties:
Phase transition temperature (° C.)

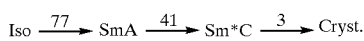

Tilt angle (30° C.): $\text{Ⓗ}$ =24.4 deg.
Spontaneous polarization (30° C.): Ps=−31.1 nC/cm$^2$

REFERENCE EXAMPLE 1

A liquid crystal device was prepared in the same manner as in Example 1 except that the electrical property control layer (205) on one substrate (201) was omitted.

Figure 4:
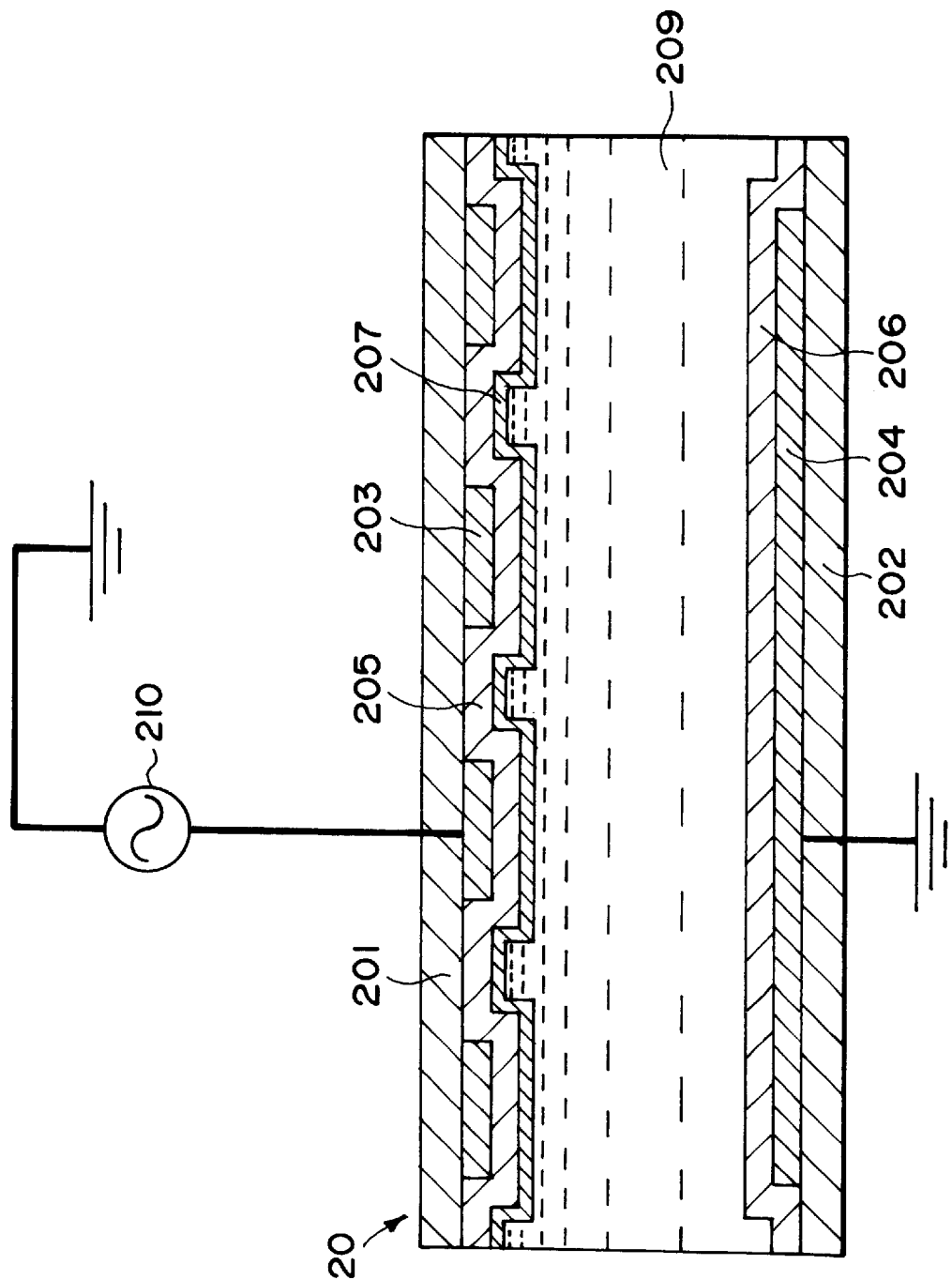
FIG. 4 illustrates a manner of experiment for evaluating a V-T characteristic of a liquid crystal device.

Each of the liquid crystal devices prepared in the above Example 1 and Reference Example 1 was subjected to evaluation of a switching characteristic, i.e., a relationship between an applied voltage and a light transmittance (V-T characteristic), in a system as shown in FIG. 4, wherein the electrodes 203 on one substrate 201 provided with the alignment control layer 207 subjected to rubbing were connected to a power source 210 to be supplied with a drive voltage waveform while grounding the counter electrodes 204.

Figure 5:
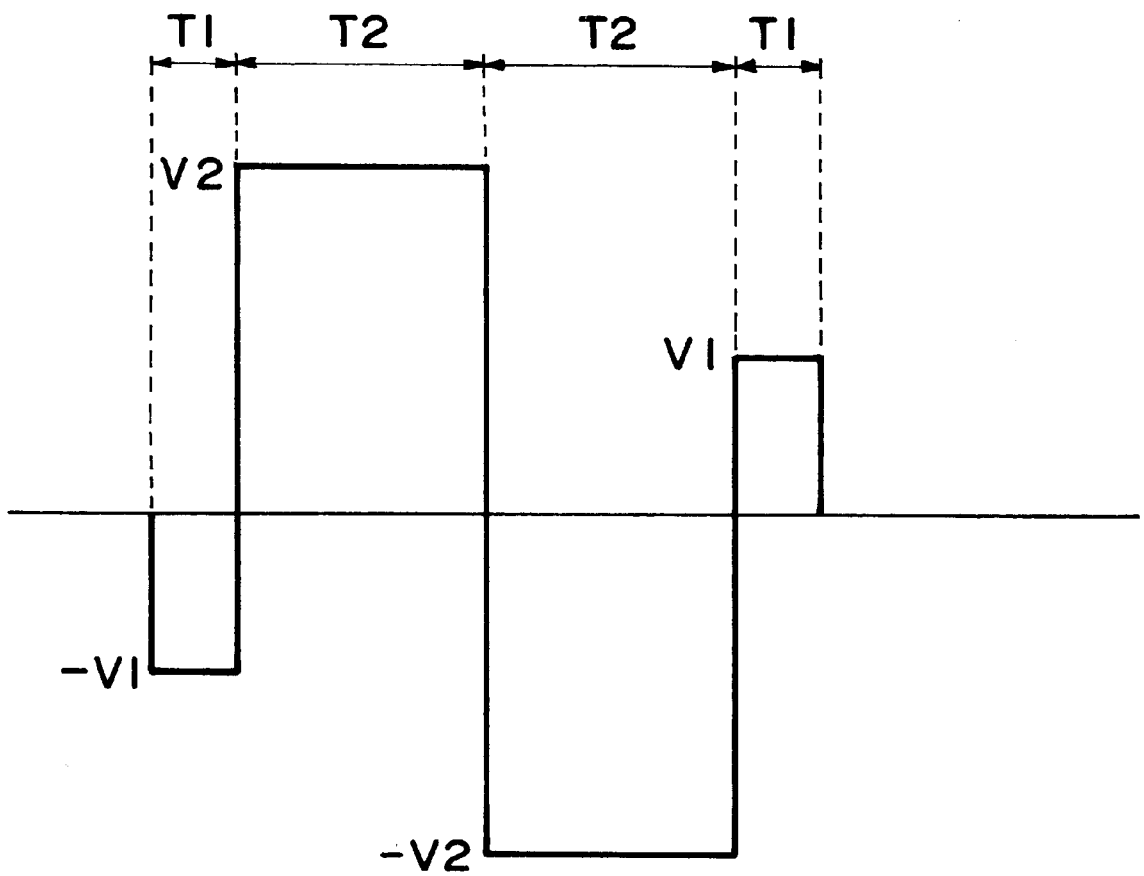
FIG. 5 is a diagram showing an example drive waveform for evaluating the experiment illustrated in FIG. 4.

More specifically, a drive voltage waveform as shown in FIG. 5 was applied, including pulses (V2 and −V2) for resetting, a pulse (V1) for writing and a pre-pulse (−V1) for providing an average voltage of zero. The reset pulses had a constant amplitude V2 of 20 volts and a constant pulse width T2 of 100 μsec., and the writing pulse (and the prepulse) were set to have varying amplitudes V1 and a constant pulse width T1.

Figure 6:
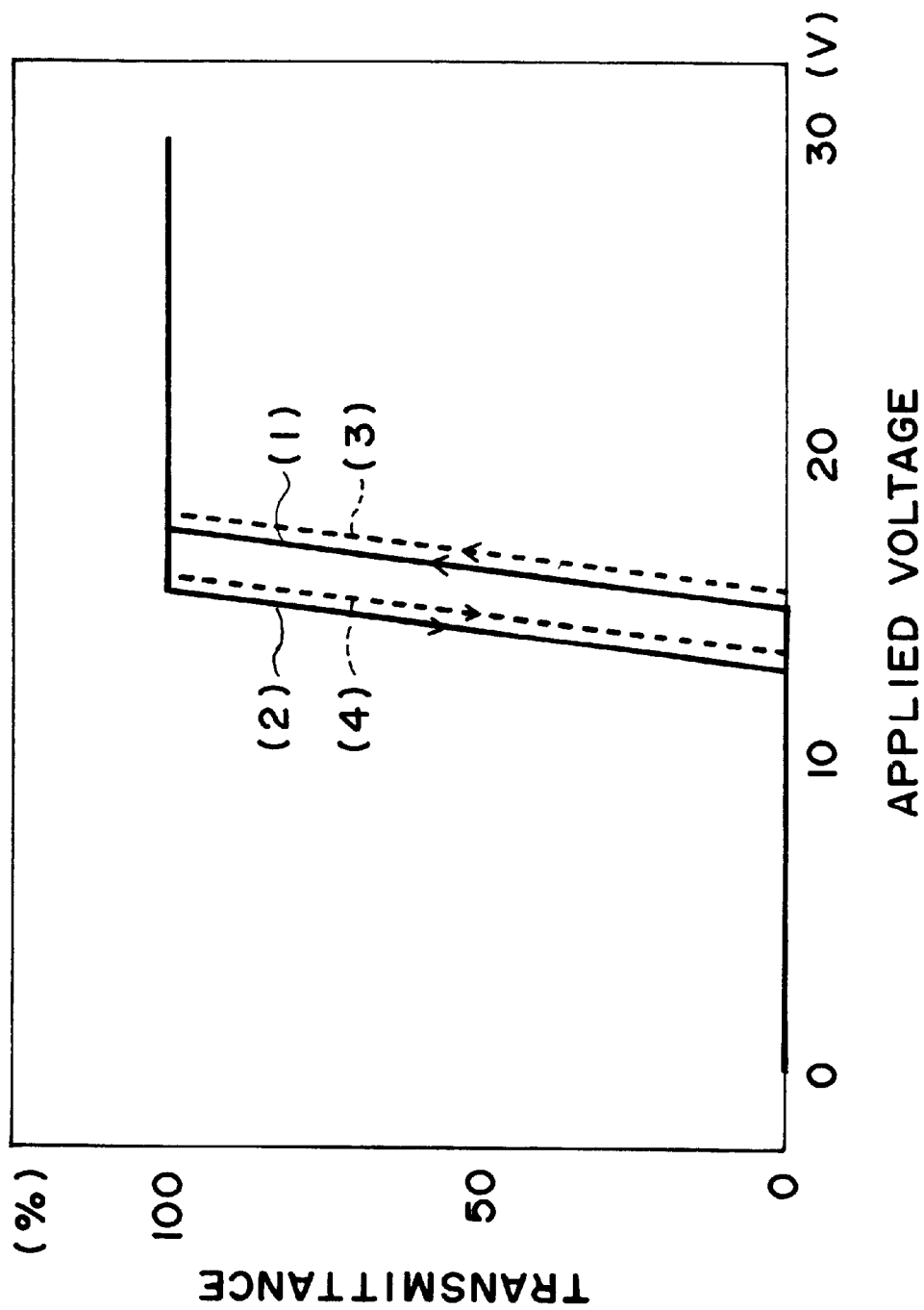
FIG. 6 is an example of V-T characteristic of a liquid crystal device showing bistability.

FIG. 6 illustrates examples of V-T characteristics (solid line and dashed line) measured in the above-described manner. Referring to FIG. 6, the solid line and the dashed line represent the following states.

[Solid lines (1) and (2)]

(1) The device is set by adjustment of the cross nicol polarizers to display a black state for one state (referred to as "U1 state") of bistable states assumed by a chiral smectic liquid crystal. The solid line (1) represents a relationship between applied voltage (V1 volts) and transmittance of the device after placing the device in U1 state resetting the device into U1 state and then applying a writing pulse (voltage V1). The line (1) is obtained by repeating the above-described sequence while gradually increasing the voltage V1 from 0 volt.

(2) The device is placed in U2 state (white display), reset into U1 state (black display) and supplied with a writing pulse (voltage V1). The solid line (2) represents a relationship between applied voltage (V1) and transmittance through the device obtained by repeating the sequence while gradually decreasing the voltage V1 from a sufficiently large value.

[Dashed lines (3) and (4)]

(3) The device is set by adjustment of the cross nicol polarizers to display a black display state for U2 state. The device is placed in U2 state, reset into U2 state (after application of −V2) and then supplied with a writing pulse (voltage V1). The dashed line (3) represents a relationship between applied voltage V1 and transmittance through the device after application of the writing pulse V1 obtained by repeating the sequence while gradually increasing the voltage V1.

(4) The device is placed in U1 state (white display) state, reset into U2 state (black display) and then supplied with a writing pulse (voltage V1). The dashed line (4) represents a relationship between applied voltage (V1) and transmittance through the device obtained by repeating the sequence while gradually decreasing the voltage V1 from a sufficiently large value.

Incidentally, the dashed lines (3) and (4) were actually obtained by using a drive waveform formed by inverting the polarity of the waveform shown in FIG. 5 but the above description is made based on the polarity shown in FIG. 5.

Referring to FIG. 6, a voltage difference between the lines (1) and (2) or between the lines (3) and (4) represents a hysteresis, i.e., an influence of a state before the switching of a liquid crystal having bistability.

The solid line (including lines (1) and (2)) and the dashed line (including lines (3) and (4)) represent switching characteristics depending on drive voltage polarities. These characteristics may preferably be identical to each other by nature. Actually, however, a voltage difference has arisen between the lines (1) and (3) (or between the lines (3) and (4)) for obtaining an identical transmittance. This represents a switching asymmetry in V-T characteristic.

For a liquid crystal showing bistability, the tolerable ranges for the hysteresis and the switching asymmetry vary depending on a drive waveform, but practically may be at most ca. 1.2 volts and 0.8 volt, respectively, in terms of absolute values.

A V-T characteristic as shown in FIG. 6 was examined at 30° C. with respect to each of the liquid crystal devices of Example 1 and Reference Example 1, whereby both liquid crystal devices exhibited a hysteresis of 0.8 volt and a switching asymmetry of −0.2 volt. Thus, the devices of Example 1 and Reference Example 1 exhibited suitably low levels of hysteresis and switching asymmetry.

Similar evaluation of V-T characteristic was performed with respect to the liquid crystal devices over a temperature range of 15–50° C. As a result, the device of Example 1 exhibited a change in switching asymmetry of ca. 0.5 volt (min. −0.5 volt and max. 0 volt), whereas the device of Reference Example 1 exhibited a change in switching asymmetry of ca. 2 volts. Thus, the device of Example 1 exhibited a suppressed temperature-dependence of switching characteristics and good display quality ensured over a wide temperature range.

EXAMPLE 2

A liquid crystal device having a structure as shown in FIG. 2 was prepared in the same manner as in Example 1 except that the electrical property control layer 205 on one substrate 201 and the alignment control layer 206 on the other substrate 202 were formed in the following manner.

Thus, substrates 201 and 202 provided with electrodes 203 and 204 were respectively coated with a solution of a silica binder precursor in an ethanol/diacetone alcohol (70/30 by weight) mixture solvent further containing ca. 100 Å-dia. Sb-doped $SnO_x$ ultra-fine particles (solid matter content=5 wt. %, particle/binder weight ratio=50/50) by spin coating at 1000 rpm for 10 sec., followed by baking at 200° C. for 60 min. to provide, 800 Å-thick films corresponding to an electrical property control layer 205 and a second alignment control layer 206, which respectively showed a surface energy of 37 dyne/cm and a volume resistivity of $2.0\times10^7$ ohm.cm.

The resultant liquid crystal device was subjected to measurement of V-T characteristic similarly as in Example 1 and Reference Example 1, whereby the liquid crystal device exhibited a switching asymmetry of 0.3 volt and sufficiently good display quality.

As a result of similar V-T characteristic measurement over a temperature range of 15–50° C., the device caused a change in switching asymmetry of only ca. 0.7 volt (min. 0.1 volt, max. 0.8 volt). Thus, the device of Example 2 exhibited a suppressed temperature-dependence of switching characteristics and a good display quality over a wide temperature range.

EXAMPLE 3

A liquid crystal device having a structure as shown in FIG. 2 was prepared in the same manner as in Example 2 except that the electrical property control layer 205 on one substrate 201 was formed in the following manner.

Thus, substrate 201 provided with electrodes 203 was coated with a solution of a silica binder precursor in an ethanol/diacetone alcohol (70/30 by weight) mixture solvent further containing ca. 100 Å-dia. Sb-doped $SnO_x$ ultra-fine particles (solid matter content=5 wt. %, particle/binder weight ratio=60/40) by spin coating at 1000 rpm for 10 sec., followed by baking at 200° C. for 60 min. to provide a 1800 Å-thick film corresponding to an electrical property control layer 205, which showed a surface energy of 38 dyne/cm and a volume resistivity of $3.0\times10^6$ ohm.cm.

The resultant liquid crystal device was subjected to measurement of V-T characteristic similarly as in Example 1 and Reference Example 1, whereby the liquid crystal device exhibited a switching asymmetry of 0.4 volt and sufficiently good display quality.

As a result of similar V-T characteristic measurement over a temperature range of 15–50° C.,the device caused a change in switching asymmetry of only ca. 0.2 volt (min. 0.2 volt, max. 0.8 volt). Thus, the device of Example 3 exhibited a suppressed temperature-dependence of switching characteristics and a good display quality over a wide temperature range.

EXAMPLE 4

A liquid crystal device having a structure as shown in FIG. 2 was prepared in the same manner as in Example 2 except that the alignment control layer 206 on the substrate 202 was formed in the following manner.

Thus, substrate 202 provided with electrode 204 was coated with a solution of a silica binder precursor in ethanol solvent further containing ca. 100 Å-dia. Sb-doped $SnO_x$ ultra-fine particles and also a silane coupling agent ("ODS-E", available from Chisso K.K.) (solid matter content=5 wt. %, particle/binder/silane coupling agent weight ratios=49.5/49.5/1) by spin coating at 1000 rpm for 10 sec., followed by baking at 200° C. for 60 min. to provide a 1700 Å-thick film corresponding to an alignment control layer 206, which showed a surface energy of 35 dyne/cm and a volume resistivity of $3.0\times10^7$ ohm.cm.

The resultant liquid crystal device was subjected to measurement of V-T characteristic similarly as in Example 1 and Reference Example 1, whereby the liquid crystal device exhibited a switching asymmetry of −0.2 volt and sufficiently good display quality.

As a result of similar V-T characteristic measurement over a temperature range of 15–50° C., the device caused a change in switching asymmetry of only ca. 0.7 volt (min. −0.4 volt, max. 0.3 volt). Thus, the device of Example 4 exhibited a suppressed temperature-dependence of switching characteristics and a good display quality over a wide temperature range.

EXAMPLE 5

A liquid crystal device having a structure as shown in FIG. 2 was prepared in the same manner as in Example 1 except that the electrical property control layer 205 on one substrate 201 and the alignment control layer 206 on the other substrate 202 were formed in the following manner.

Thus, substrates 201 and 202 provided with electrodes 203 and 204 were respectively coated with a solution of a $TiO_2/SiO_2$ binder precursor in a hexylene glycol/NMP/IPA/butanol mixture solvent further containing $Sb_2O_5$ particles (solid matter content=20 wt. %), by spin coating at 750 rpm for 15 sec. and 1500 rpm for 30 sec., followed by baking at 200° C. for 60 min. to provide 940 Å-thick films corresponding to an electrical property control layer 205 and a second alignment control layer 206, which respectively showed a surface energy of 39 dyne/cm and a volume resistivity of $4.0\times10^5$ ohm.cm.

The resultant liquid crystal device was subjected to measurement of V-T characteristic similarly as in Example 1 and Reference Example 1, whereby the liquid crystal device exhibited a switching asymmetry of 0.7 volt and sufficiently good display quality.

As a result of similar V-T characteristic measurement over a temperature range of 15–50° C., the device caused a change in switching asymmetry of ca. 0.8 volt (min. 0.5 volt, max. 1.2 volt). Thus, the device of Example 5 exhibited a suppressed temperature-dependence of switching characteristics and a good display quality over a wide temperature range.

As described above, according to the present invention, there is provided a liquid crystal device, particularly a liquid crystal device using a liquid crystal assuming a chiral smectic phase, which liquid crystal device exhibits a good alignment characteristic, a suppressed influence of a reverse electric filed occurring at the time of switching of the liquid crystal, a reduced switching asymmetry, and a stable high-speed switching performance.

What is claimed is:

1. A liquid crystal device, comprising a pair of substrates and a liquid crystal disposed between the substrates,
    wherein one of said pair of substrates has thereon a laminate structure including an electrode, an electrical property control layer and an alignment control layer subjected to a uniaxial aligning treatment contacting the liquid crystal disposed in this order on the substrate, said alignment control layer having a thickness of at most 100 Å and a volume resistivity larger than that of the electrical property control layer, the other substrate has thereon a second alignment control layer not subject to a uniaxial aligning treatment but contacting the liquid crystal, and both the electrical control layer on said one substrate and said second alignment control layer have a volume resistivity in the range of $1.0 \times 10^4 – 1.0 \times 10^{10}$ ohm.cm.

2. A liquid crystal device according to claim 1, wherein the electrical property control layer has a volume resistivity of $1.0 \times 10^4 – 1.0 \times 10^{10}$ ohm.cm at room temperature.

3. A liquid crystal device according to claim 1, wherein the electrical property control layer has a volume resistivity of $1.0 \times 10^4 – 1.0 \times 10^8$ ohm.cm.

4. A liquid crystal device according to claim 1, wherein said alignment control layer has been subjected to rubbing as the uniaxial aligning treatment.

5. A liquid crystal device according to any one of claims 1 to 4, wherein the liquid crystal is a liquid crystal assuming a chiral smectic phase.

6. A liquid crystal device according to claim 1, wherein both said electrical property control layer on said one substrate and said second alignment control layer have a volume resistivity in the range of $1.0 \times 10^4 – 1.0 \times 10^8$ ohm.cm.

7. A liquid crystal device according to claim 1, wherein said electrical property control layer on said one substrate and said second alignment control layer comprise identical materials.

8. A liquid crystal device, comprising a pair of substrates and a liquid crystal disposed between the substrates, said liquid crystal assuming a chiral smectic phase, wherein at least one substrate has thereon a laminate structure including an electrode, an electrical property control layer and an alignment control layer subjected to a uniaxial aligning treatment contacting the liquid crystal disposed in this order on the substrate, and said alignment control layer has a thickness of at most 100 Å, and a volume resistivity larger than that of the electrical property control layer, and wherein one of said pair of substrates has thereon the electrical property control layer and the alignment control layer subjected to a uniaxial aligning treatment and contacting the liquid crystal, and the other substrate has thereon a second alignment control layer contacting the liquid crystal; the alignment control layer subjected to a uniaxial aligning treatment has a dispersion term of surface energy ($\gamma_d$) of at least 40 dyne/cm, and said second alignment control layer having a dispersion term of surface energy ($\gamma_d$) which is smaller by at least 5 dyne/cm than that of the alignment control layer subjected to a uniaxial aligning treatment.

9. A liquid crystal device according to claim 8, wherein said electrical property control layer and said second alignment control layer comprise identical materials.

10. A liquid crystal device according to claim 1, wherein said alignment control layer subjected to a uniaxial aligning treatment has a dispersion term of surface energy ($\gamma_d$) which is larger by at least 5 dyne/cm than that of said second alignment control layer not subjected to a uniaxial aligning treatment.

11. A liquid crystal device according to claim 1, wherein the electrical property control layer on said one substrate and the second alignment control layer on said the other substrate are respectively a film comprising a material selected from the group consisting of polycrystalline or amorphous metal oxides, polycrystalline or amorphous semiconductors and insulating matrix materials containing electroconductive particles dispersed therein.

12. A liquid crystal device according to claim 1, wherein said alignment control layer subjected to a uniaxial aligning treatment has been subjected to rubbing as the uniaxial aligning treatment.

13. A liquid crystal device according to claim 1, wherein said alignment control layer subjected to a uniaxial aligning treatment comprises a polyimide.

14. A liquid crystal device according to claim 8, wherein the electrical property control layer on said one substrate and the alignment control layer on said the other substrate are respectively a film comprising a material selected from the group consisting of polycrystalline or amorphous metal oxides, polycrystalline or amorphous semiconductors and insulating matrix materials containing electroconductive particles dispersed therein.

15. A liquid crystal device according to claim 8, wherein said alignment control layer subjected to a uniaxial aligning treatment has been subjected to rubbing as the uniaxial aligning treatment.

16. A liquid crystal device according to claim 8, wherein said alignment control layer subjected to a uniaxial aligning treatment comprises a polyimide.

17. A liquid crystal device according to claim 5, wherein said liquid crystal has a spontaneous polarization (absolute value) of at least 10 nC/cm$^2$.

18. A liquid crystal device according to claim 5, wherein said liquid crystal has a spontaneous polarization (absolute value) of at least 20 nC/cm$^2$.

19. A liquid crystal device according to claim 5, wherein said liquid crystal assuming a chiral smectic phase is a liquid crystal composition containing a fluorine-containing mesomorphic compound including a fluorocarbon terminal portion and a hydrocarbon portion connected via a central core and having a smectic phase or a latent smectic phase.

20. A liquid crystal apparatus, comprising a liquid crystal device according to claim 1 or 9, and drive means for driving the liquid crystal device.

21. A liquid crystal device according to claim 1, wherein said other substrate has thereon a second electrical property control layer below said second alignment control layer, said second electrical property control layer having a volume resistivity smaller than that of said second alignment control layer.

* * * * *

UNITED STATES PATENT AND TRADEMARK OFFICE
CERTIFICATE OF CORRECTION

PATENT NO. : 5,973,761
DATED : October 26, 1999
INVENTOR(S) : Ihachiro Gofuku et al.

It is certified that error appears in the above-identified patent and that said Letters Patent is hereby corrected as shown below:

Title page,
Item [54], "FERROELECTIC" should read -- FERROELECTRIC --.

Column 1,
Line 1, "FERROELECTIC" should read -- FERROELECTRIC --.

Column 12,
Line 51, "-0-CO-." should read -- -O-CO-, -- (alpha O).

Column 51,
"$R_{12}$" should read -- $R_{12}$ --.
"$C_6H_{11}$" should read -- $C_5H_{11}$ --
"$C_6H_{11}$" should read -- $C_6H_{11}$ --

Column 53,
Line 22, "does" should read -- do --.

Column 54,
Line 1, "%-:solution" should read -- %-solution --.

Column 57,
Line 50, "15-50° C., the" should read -- 15-50° C., the --.

Signed and Sealed this

Ninth Day of October, 2001

Attest:

NICHOLAS P. GODICI
Attesting Officer
Acting Director of the United States Patent and Trademark Office